(12) United States Patent  (10) Patent No.: US 7,974,256 B2
Sugaya et al.  (45) Date of Patent: Jul. 5, 2011

(54) RADIO COMMUNICATION SYSTEM, RADIO COMMUNICATION APPARATUS AND METHOD

(75) Inventors: Shigeru Sugaya, Kanagawa (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 11/528,456

(22) Filed: Sep. 28, 2006

(65) Prior Publication Data

US 2007/0019607 A1  Jan. 25, 2007

(30) Foreign Application Priority Data

Oct. 3, 2005 (JP) ................. P2005-290195

(51) Int. Cl.
*H04J 1/00* (2006.01)
(52) U.S. Cl. .......... 370/343; 370/311; 370/22; 370/347; 455/502; 455/542.2; 455/394; 455/574
(58) Field of Classification Search .................. 455/502, 455/542.2, 574; 370/222, 311, 347, 394
See application file for complete search history.

(56) References Cited

U.S. PATENT DOCUMENTS

| 5,384,777 | A * | 1/1995 | Ahmadi et al. ............... 370/337 |
| 6,646,983 | B1 * | 11/2003 | Roy et al. ...................... 370/218 |
| 6,671,284 | B1 * | 12/2003 | Yonge et al. .................. 370/462 |
| 7,454,218 | B2 * | 11/2008 | Mo et al. ....................... 455/502 |
| 2005/0237964 | A1 * | 10/2005 | Kupershmidt ............... 370/321 |
| 2006/0009229 | A1 * | 1/2006 | Yuan et al. ................. 455/452.1 |
| 2006/0251098 | A1 * | 11/2006 | Morioka ........................ 370/432 |
| 2007/0014273 | A1 * | 1/2007 | Kuperschmidt et al. ...... 370/347 |
| 2007/0054680 | A1 * | 3/2007 | Mo et al. ........................ 455/502 |
| 2007/0153717 | A1 * | 7/2007 | Tervonen et al. ............. 370/320 |
| 2007/0213012 | A1 * | 9/2007 | Marin et al. ................. 455/63.3 |
| 2007/0248063 | A1 * | 10/2007 | Habetha ........................ 370/338 |

FOREIGN PATENT DOCUMENTS

JP  2004-153558  5/2004

OTHER PUBLICATIONS

Yunpeng Zang, Guido R. Hiertz, Towards high speed wireless personal area nework—Efficiency Analysis of MBOA MAC. Jan. 2005, RWTH Aachen University, pp. 1-10.*

* cited by examiner

*Primary Examiner* — Kamran Afshar
*Assistant Examiner* — Khalid Shaheed
(74) *Attorney, Agent, or Firm* — Finnegan, Henderson, Farabow, Garrett & Dunner L.L.P.

(57) ABSTRACT

A radio communication system for carrying out communications among a plurality of radio communication apparatus pertaining to the radio communication system through a radio network connecting the radio communication apparatus with each other wherein, each of the radio communication apparatus includes an access setting unit configured to prescribe a super frame period within a predetermined time and setting a reserved period within the super frame as a period for making an access to the radio network, and the access setting unit selects either a first reservation setting method not contending with reservation setting done by another radio communication apparatus, or a second reservation setting method possibly contending with reservation setting done by another radio communication apparatus.

8 Claims, 16 Drawing Sheets

| RESERVATION TYPE | |
|---|---|
| 0 | OTHER BEACON PERIOD |
| 1 | HARD-DRP RESERVATION |
| 2 | SOFT-DRP RESERVATION |
| 3 | PRIVATE RESERVATION |
| 4 | PCA RESERVATION |
| 5-7 | Reserved |

| REASON CODE | |
|---|---|
| 0 | RESERVATION REQUEST CONFIRMED |
| 1 | OCCURRENCE OF DRP RESERVATION CONTENTION |
| 2 | START OF RESERVATION REQUEST |
| 3 | RESERVATION REQUEST DISCARDED |
| 4 | RESERVATION REQUEST BEING ADJUSTED |
| 5-7 | Reserved |

RADIO COMMUNICATION SYSTEM, RADIO COMMUNICATION APPARATUS AND METHOD

This application claims the benefit of priority to Japanese Patent Application No. 2005-290195, filed Oct. 3, 2005.

CROSS REFERENCES TO RELATED APPLICATIONS

The present invention contains subject matter related to Japanese Patent Application JP 2005-290195, filed in the Japanese Patent Office on Oct. 3, 2005, the entire contents of which being incorporated herein by reference.

BACKGROUND OF THE INVENTION

1. Field of the Invention

The present invention relates to a radio communication system, a radio communication apparatus and a computer program. More particularly, the present invention relates to a radio communication system for making a PCA (Prioritized Channel Access) in a band reserved in advance, a radio communication apparatus employed in the system and a computer program implementing functions of the apparatus.

2. Description of the Related Art

In recent years, as a method of constructing a small-scale network for carrying out radio communications, there is generally adopted a method of using a radio communication system conforming to methods according to IEEE802.11 as a radio LAN (Local Area Network). In addition, attention is recently being focused on a radio communication method using a UWB (Ultra Wide Band) communication system. As a radio communication method using the UWB communication system, there was considered a method of carrying out high-speed radio communications by using a PAN (Personal Area Network), which is a network having a range narrower than that of a radio LAN.

As one of access control methods of the PAN (Personal Area Network) in the UWB communication system, there was considered a method of defining a distributed MAC (Media Access Control). In the distributed MAC, there was defined a method for carrying out a communication in a stable manner by using a DRP (Distributed Reservation Protocol). This defined method is a method for providing a time slot known as a MAS (Media Access Slot) in a predetermined super frame period, reserving the MAS and setting utilization of the MAS.

In addition, in accordance with the DRP (Distributed Reservation Protocol), a communication apparatus for carrying out a communication is capable of utilizing media by exclusively occupying the media. Thus, the method can be defined as a method capable of carrying out a communication in a stable manner.

In the distributed MAC (Media. Access Control), on the other hand, there has also been prescribed a communication method based on the PCA (Prioritized Channel Access) technique as a method for carrying out a communication without making a reservation by using the DRP (Distributed Reservation Protocol). With the communication method, a communication can be carried out with ease by using a period, for which reservation using the DRP is not set.

In addition, Japanese Patent Laid-open No. 2004-153558 (Patent Document 1) discloses a method of setting CP_Min_Duration so as to assure a possible minimum communication in a CP (Contention Period) for any communication such as inspection of a web besides reserved communications such as transmissions of images.

SUMMARY OF THE INVENTION

By the way, since the PCA (Prioritized Channel Access) technique is implemented by carrying out a communication by using an unreserved period, the PCA technique raises a problem that a satisfactory communication cannot be carried out if there are a large number of periods, for each of which a reservation is made by using the DRP.

In addition, in a reservation made by using the DRP (Distributed Reservation Protocol), it is necessary to reserve a period to be used prior to a communication. It is thus difficult to provide a method for carrying a communication with ease.

On top of that, even with set stable utilization of a communication based on the PCA (Prioritized Channel Access) technique in its own network, if a communication using the DRP (Distributed Reservation Protocol) is set anew in another communication system or another network, the newly set communication takes precedence of the set stable utilization of a communication based on the PCA technique, raising a problem that the communication based on the PCA technique undesirably becomes instable and, eventually, the communication cannot be established.

In addition, with the method of setting CP_Min_Duration so as to assure a possible minimum communication in a CP (Contention Period) as disclosed in Patent Document 1, since the period is not a reserved period, there is still room for other communications to be established. Thus, even if a possible minimum communication period can be assured in its own network but another network physically adjacent to its own network exists, the method raises a problem that it is quite within the bounds of possibility that a communication is undesirably carried out in the contention period so that a satisfactory communication period cannot be assured.

In addition, in the case of the ad hoc network, in a space where another communication system exists, there is required a definition of a method for this communication system to implement a PCA (Prioritized Channel Access) technique in a stable manner.

On top of that, if a communication based on the PCA (Prioritized Channel Access) technique is carried out in a stable manner, there is required a definition of a method to continue the execution of the communication based on the PCA technique in a stable manner even if communications are established in another communication system and/or another network.

Addressing the problems raised by the conventional technologies described above, inventors of the present invention have devised a new and improved radio communication system capable of carrying out a communication based on the PCA (Prioritized Channel Access) technique in a reserved period after a reservation is made by using the DRP (Distributed Reservation Protocol) in order to implement the PCA technique in a stable manner, devised a radio communication apparatus to be employed in the system and a computer program implementing functions of the apparatus.

In order to solve the problems described above, in accordance with a first embodiment of the present invention, there is provided a radio communication system for carrying out communications among a plurality of radio communication apparatus pertaining to the radio communication system through a radio network connecting the apparatus with each other. In the system, the radio communication system according to the embodiment of the present invention has an access setting unit (such as a MAS access setting unit 807 to be described later) for prescribing a super frame period within a predetermined time and setting a reserved period within the super frame as a period for making an access to the radio network. The access setting unit selects a first reservation setting method not contending with reservation setting done by another radio communication apparatus, or a second reservation setting method possibly contending with reservation setting done by another radio communication apparatus.

The first reservation setting method adopted in the radio communication system described above is typically implemented as follows. In order to carry out a communication between first and second ones of the radio communication apparatus by adoption of the first reservation setting method: the first radio communication apparatus transmits a beacon signal to the second radio communication apparatus as a signal conveying a request for a reservation; the second radio communication apparatus transmits a beacon signal to the first radio communication apparatus as a signal conveying information on adjustment of the request for a reservation; and the first and second radio communication apparatus confirm the request for a reservation.

The second reservation setting method adopted in the radio communication system described above is typically implemented as follows. In order to carry out a communication between first and second ones of the radio communication apparatus by adoption of the second reservation setting method: the first radio communication apparatus acquires a beacon signal from the second radio communication apparatus in order to obtain information on a state of reservation setting in the second radio communication apparatus; after confirming a reservation, the first radio communication-apparatus transmits a beacon signal to the second radio communication apparatus as a signal notifying the second radio communication apparatus that the reservation has been confirmed. Further, the second radio apparatus sets a reserved period on the basis of the reservation confirmation made by the first radio communication apparatus.

In accordance with the radio communication system described above, the access setting unit can select a first reservation setting method (such as a DRP reservation setting method) not contending with reservation setting-done by another radio communication apparatus or a second reservation setting method (such as a PCA reservation setting method) possibly contending with reservation setting done by another radio communication apparatus. If a specific radio communication apparatus selects the second reservation setting method, the specific radio communication apparatus transmits a beacon signal to other radio communication apparatus as a signal notifying the other apparatus that access control based on the second reservation setting method is to be executed. Notified of the fact that access control based on the second reservation setting method is to be executed, the other radio communication apparatus execute control to refrain themselves from carrying out communications of their own in the reserved period. Thus, when the reserved period arrives, the specific radio communication apparatus is capable of transmitting a signal by taking precedence of the other radio communication apparatus. In this way, after a reservation based on the first reservation setting method such as the DRP reservation setting method is made, a communication based on the second reservation setting method such as the PCA reservation setting method in the reserved period can be carried out in a stable manner.

In addition, in order to solve the problems described above, in accordance with a second embodiment of the present invention, there is provided a radio communication apparatus capable of communicating with other radio communication apparatus through a radio network connecting the radio communication apparatus with each other. The radio communication apparatus has an access setting unit (such as the MAS access setting unit 807 to be described later) for prescribing a super frame period within a predetermined time and setting a reserved period within the super frame as a period for making an access to the radio network. The radio communication apparatus further has a beacon generation unit (such as a beacon generation unit 805 to be described later) for generating a beacon signal for notifying another radio communication apparatus of information on a set reservation of a period to be used for making an access to the radio network; and a beacon signal analysis unit (such as a beacon-signal analysis unit 804 to be described later) for analyzing a beacon signal received from another radio communication apparatus. The access setting unit selects either first reservation setting method not contending with reservation setting done by another radio communication apparatus, or a second reservation setting method possibly contending with reservation setting done by another radio communication apparatus.

In the radio communication apparatus described above, when the access setting unit selects the first reservation setting method, the radio communication apparatus transmits a beacon signal to one of the other radio communication apparatus, which is to serve as a communication partner of the radio communication apparatus, as a signal conveying a request for a reservation, and after a beacon signal is received from the other radio communication apparatus as a signal conveying information on adjustment of the request for a reservation, the request for a reservation is confirmed.

In the radio communication apparatus described above, if any one of the other radio communication apparatus, which is to serve as a communication partner of the radio communication apparatus, has been identified, the first reservation setting method is selected.

In the radio communication apparatus described above, when the access setting unit selects the second reservation setting method, the radio communication apparatus acquires a beacon signal from one of the other radio communication apparatus, which is to serve as a communication partner of the radio communication apparatus, in order to obtain information on a state of setting of a reservation in the other radio communication apparatus. And after confirming the reservation, the radio communication apparatus transmits a beacon signal to the other radio communication apparatus as a signal notifying the other radio communication apparatus that the reservation has been confirmed.

In accordance with the radio communication apparatus described above, the access setting unit can select a first reservation setting method (such as a DRP reservation setting method) not contending with reservation setting done by another radio communication apparatus or a second reservation setting method (such as a PCA reservation setting method) possibly contending with reservation setting done by another radio communication apparatus. If the radio communication apparatus described above selects the second reservation setting method, the radio communication apparatus described above transmits a beacon signal to other radio communication apparatus as a signal notifying the other apparatus that access control based on the second reservation setting method is to be executed. Notified of the fact that access control based on the second reservation setting method is to be executed, the other radio communication apparatus execute control to refrain themselves from carrying out communications of their own in the reserved period. Thus, when the reserved period arrives, the radio communication apparatus described above is capable of transmitting a signal by taking precedence of the other radio communication apparatus. In this way, after a reservation based on the first reservation setting method such as the DRP reservation setting method is made, a communication based on the second reservation setting method such as the PCA reservation setting method in the reserved period can be carried out in a stable manner.

In addition, in order to solve the problems described above, in accordance with a third embodiment of the present invention, there is provided a computer program to be executed by a computer to carry out functions of a radio communication apparatus pertaining to the radio communication system according to the first embodiment of the present invention or the radio communication apparatus according to the second embodiment of the present invention. On top of that, in accordance with a fourth embodiment of the present invention, there is provided a recording medium usable for recording the computer program according to the third embodiment of the present invention. The computer program is a program that can be described in any program language. The recording medium usable for recording the computer program can be the ordinary contemporary recording medium or any recording medium to be used in the future. Examples of the contemporary recording medium are a CD-ROM, a DVD-ROM and a flexible disk.

As described above, in accordance with the embodiment of the present invention, in order to implement the PCA (Prioritized Channel Access) technique in a stable manner, a reservation based on the DRP (Distributed Reservation Protocol) is made and then, in the reserved period, a communication based on the PCA technique is carried out.

Other effects of the embodiment of the present invention are described below. The other effects will be explained in detail later in the description of preferred embodiments of the present invention.

In accordance with the embodiment of the present invention, it is possible to implement a method of carrying out a communication based on the PCA technique in a stable manner after making a reservation based on the DRP (Distributed Reservation Protocol) in the reserved period without disturbing communications in another communication system or in another network.

In accordance with the embodiment of the present invention, it is also possible to provide a radio communication apparatus with a method of carrying out a communication based on the PCA technique in a stable manner without being blocked by the DRP of another communication apparatus even if the radio communication apparatus exists at a place physically adjacent to the other communication apparatus pertaining to another network.

In accordance with the embodiment of the present invention, it is possible to provide a method to effectively transfer setting of contention-based accesses to a hidden terminal by making a reservation for executing control of contention-based accesses and reporting the reservation by means of a beacon signal in advance.

In accordance with the embodiment of the present invention, it is possible to implement a method to make a reservation for executing control of contention-based accesses more easily than the ordinary reservation transmission protocol by making the reservation in accordance with a predetermined sequence.

In accordance with the embodiment of the present invention, if a demand for a communication is raised, a time that can be used by a receiving radio communication apparatus is reserved on the basis of information reported by a beacon signal in advance as information on usable times so as to allow the reservation to be made in a short period of time.

In accordance with the embodiment of the present invention, by temporarily making a reservation only within one super frame in order to execute control of contention-based accesses, it is possible to implement an effective reservation protocol without wasteful reservation setting having effects on later processes.

BRIEF DESCRIPTION OF THE DRAWINGS

These and other objects and features of the present invention will become clear from the following description of the preferred embodiments given with reference to the accompanying diagrams, in which:

FIG. 13 is an explanatory diagram showing typical description of a reservation type;

FIG. 14 is an explanatory diagram showing typical description of a reason code;

DETAILED DESCRIPTION OF THE PREFERRED EMBODIMENTS

Figure 1:
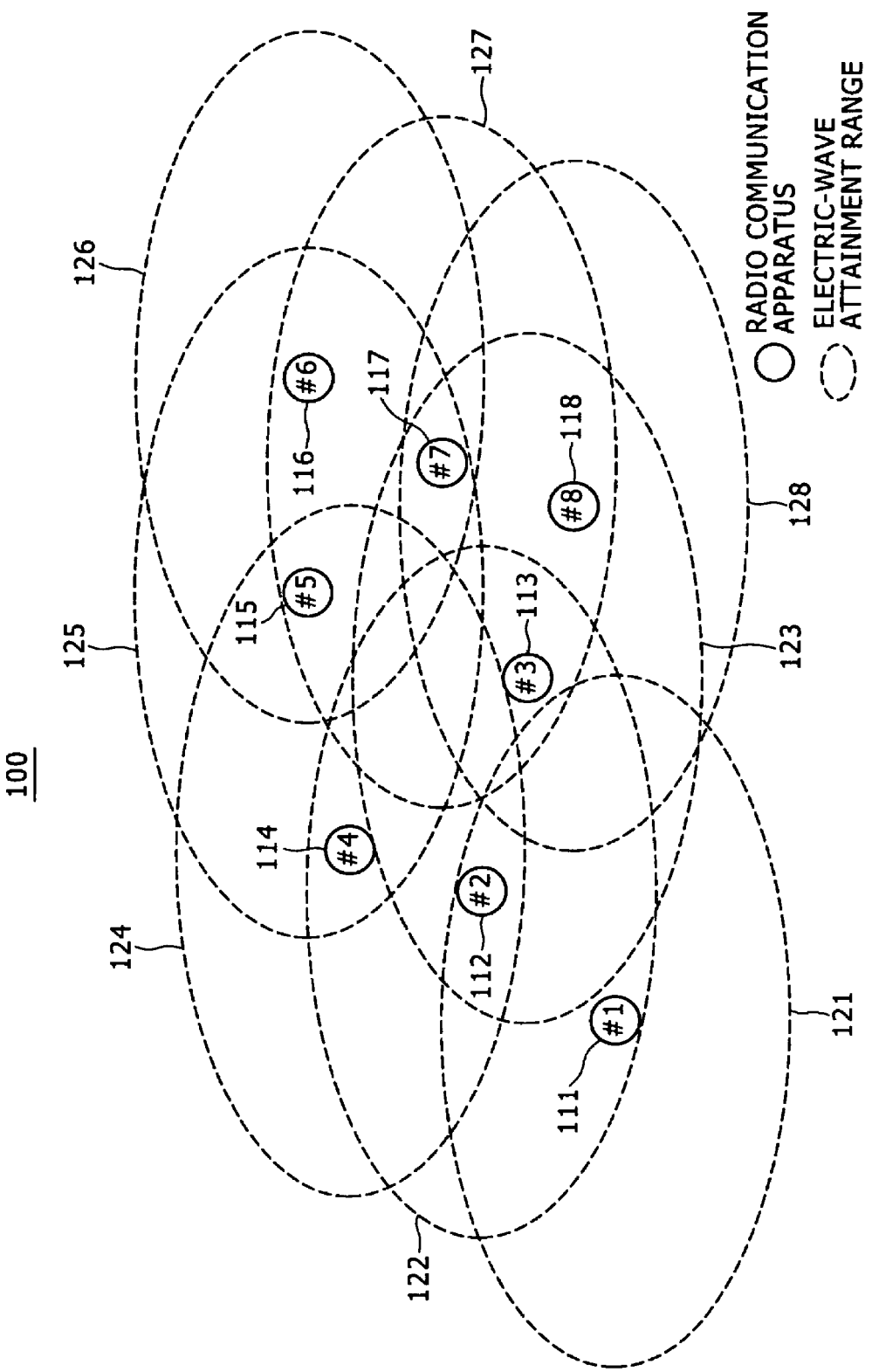
FIG. 1 is an explanatory diagram showing a typical configuration of a radio ad hoc network.

By referring to diagrams, the following description explains details of preferred embodiments implementing a radio communication system, a radio communication apparatus and a computer program, which are provided by the present invention. It is to be noted that configuration elements essentially having functional configurations identical with each other are denoted by the same reference numeral throughout this patent specification and the diagrams included in the specification so as to avoid duplications of explanations. In addition, in the following description, the radio communication apparatus is also referred to simply as a communication apparatus.

(1) Typical Configuration of a Radio Ad Hoc Network (Shown in FIG. 1)

FIG. 1 is a diagram showing a typical configuration of a radio ad hoc network 100 based on autonomous distributed control. In FIG. 1, a dashed line encloses an electric-wave attainment range of a communication apparatus existing at the center of the range.

Thus, communication apparatus #1 denoted by reference numeral 111 is capable of communicating with communication apparatus #2 denoted by reference numeral 112 existing in the electric-wave attainment range 121 of communication apparatus #1. Communication apparatus #2 denoted by reference numeral 112 is capable of communicating with communication apparatus existing in the electric-wave attainment range 122 of communication apparatus #2, that is, capable of communicating with communication apparatus #1, #3 and #4 denoted by reference numerals 112, 113 and 114 respectively. Communication apparatus #3 denoted by reference numeral 113 is capable of communicating with communication apparatus existing in the electric-wave attainment range 123 of communication apparatus #3, that is, capable of communicating with communication apparatus #2, #7 and #8 denoted by reference numerals 112, 117 and 118 respectively. Communication apparatus #4 denoted by reference numeral 114 is capable of communicating with communication apparatus existing in the electric-wave attainment range 124 of communication apparatus #4, that is, capable of communicating with communication apparatus #2 and #5 denoted by reference numerals 112 and 115 respectively. Communication apparatus #5 denoted by reference numeral 115 is capable of communicating with communication apparatus existing in the electric-wave attainment range 125 of communication apparatus #5, that is, capable of communicating with communication apparatus #4, #6 and #7 denoted by reference numerals 114, 116 and 117 respectively. Communication apparatus #6 denoted by reference numeral 116 is capable of communicating with communication apparatus existing in the electric-wave attainment range 126 of communication apparatus #6, that is, capable of communicating with communication apparatus #5 and #7 denoted by reference numerals 115 and 117 respectively. Communication apparatus #7 denoted by reference numeral 117 is capable of communicating with communication apparatus existing in the electric-wave attainment range 127 of communication apparatus #7, that is, capable of communicating with communication apparatus #3, #5, #6 and #8 denoted by reference numerals 113, 115, 116 and 118 respectively. Communication apparatus #8 denoted by reference numeral 118 is capable of communicating with communication apparatus existing in the electric-wave attainment range 128 of communication apparatus #8, that is, capable of communicating with communication apparatus #3 and #7 denoted by reference numerals 113 and 117 respectively.

Figure 2:
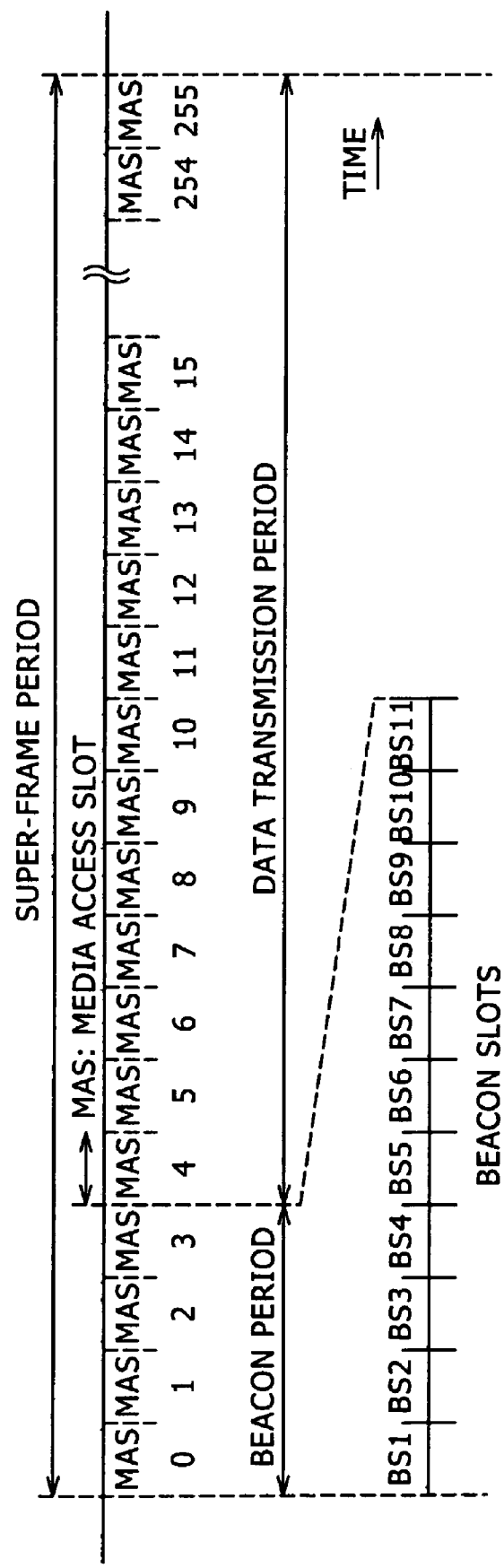
FIG. 2 is an explanatory diagram showing a typical configuration of a super frame.

(2) Typical Configuration of a Super Frame (Shown in FIG. 2)

FIG. 2 is a diagram showing a typical configuration of a super frame. That is to say, FIG. 2 shows definition of a super frame within a predetermined time period. As shown in the figure, the super frame is divided into 256 MASes (Media Access Slots), i.e., MAS-0 to MAS-255, and includes periods, that is, a beacon period and a data transmission period.

The beacon period includes beacon-slots each having a predetermined width. Such a configuration of the beacon period allows parameters to be exchanged between any communication apparatus and its surrounding communication apparatus by using beacon slots each assigned uniquely to one of the communication apparatus. The length of the beacon period is dependent on the number of surrounding communication apparatus existing at that time. In the case of this embodiment, the beacon period uses media access slots MAS-0 to MAS-3 to include a total of 12 beacon slots, i.e., beacon slot #0 denoted by reference notation BS0 to beacon slot #11 denoted by reference notation BS11.

Figure 3:
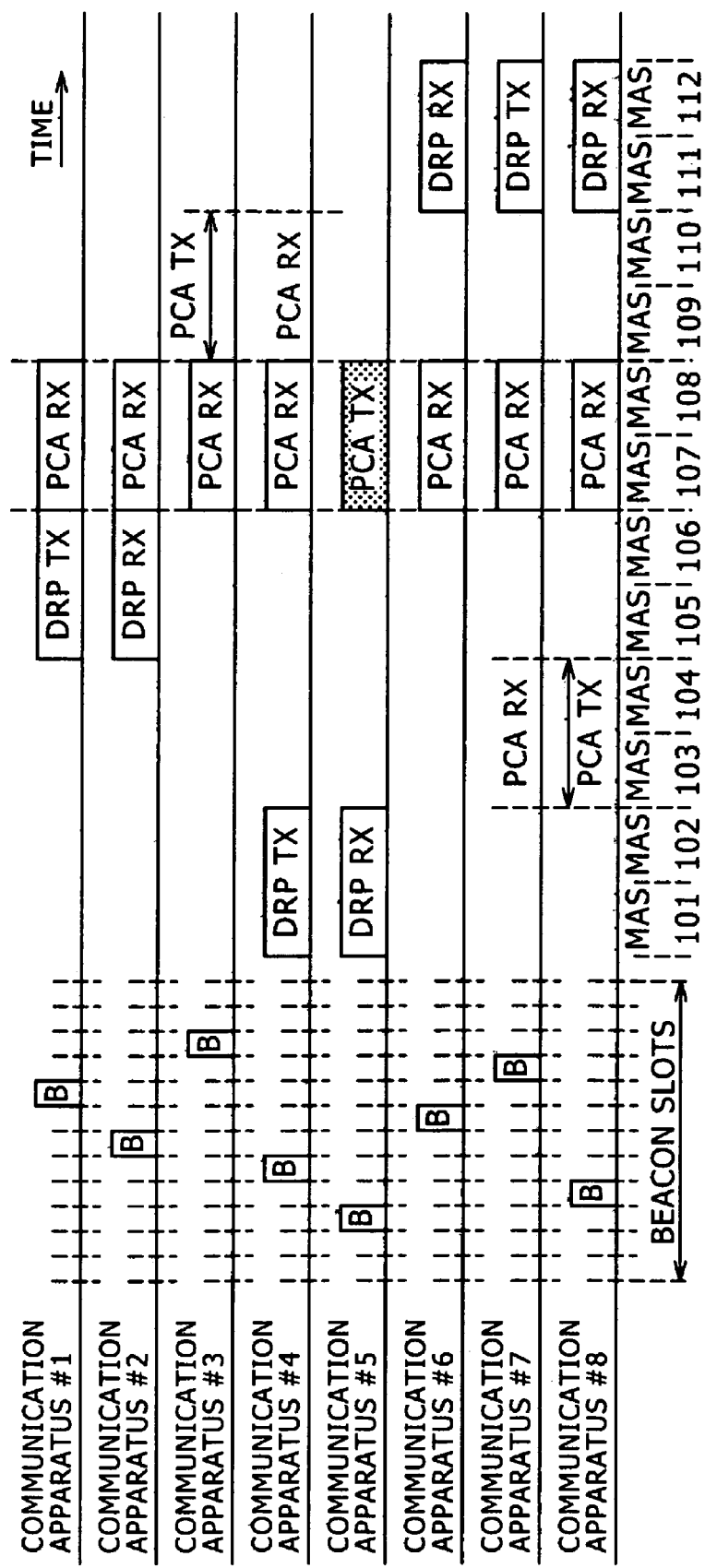
FIG. 3 is an explanatory diagram showing typical setting of utilization of beacon slots.

(3) Typical Setting of Utilization of Beacon Slots (Shown in FIG. 3)

FIG. 3 is a diagram showing typical setting of utilization of beacon slots. That is to say, FIG. 3 shows a result of selecting beacon slots used by communication apparatus themselves. A beacon slot is selected through a process in which each communication apparatus pertaining to a network group notifies its surrounding communication apparatus pertaining to the same network group of beacon slots unused by the beacon-slot notifying communication apparatus.

In the example shown in the figure, communication apparatus #1 transmits its own beacon through beacon slot 7 denoted by reference notation BS7. Communication apparatus #2 transmits its own beacon through beacon slot 5 denoted by reference notation BS5. Communication apparatus #3 transmits its own beacon through beacon slot 9 denoted by reference notation BS9. Communication apparatus #4 transmits its own beacon through beacon slot 4 denoted by reference notation BS4. Communication apparatus #5 transmits its own beacon through beacon slot 2 denoted by reference notation BS2. Communication apparatus #6 transmits its own beacon through beacon slot 6 denoted by reference notation BS6. Communication apparatus #7 transmits its own beacon through beacon slot 8 denoted by reference notation BS8. Communication apparatus #8 transmits its own beacon through beacon slot 3 denoted by reference notation BS3.

In addition, the configuration also includes beacon slots 0, 1, 10 and 11 denoted by reference notations BS0, BS1, BS10 and BS11 respectively as slots each allocated to a communication apparatus newly participating in the network.

FIG. 3 also shows typical utilization setting of PCA reservations. That is to say, in addition to exchanges of beacon information through predetermined beacon slots, the figure also shows a configuration for properly carrying out DRP reservations and communications each using a PCA technique for every MAS (Media Access Slot).

To put it concretely, MAS 101 and MAS 102 are used for DRP reservations made for communication apparatus #4 and #5 as reservations allowing a communication to be carried out from communication apparatus #4 to communication apparatus #5. By the same token, MAS 105 and MAS 106 are used for DRP reservations made for communication apparatus #1 and #2 as reservations allowing a communication to be carried out from communication apparatus #1 to communication apparatus #2.

In addition, in the configuration, MAS 109 and MAS 110 are used for a communication based on the PCA technique as a communication from communication apparatus #3 to communication apparatus #4, whereas MAS 111 and MAS 112 are used for DRP reservations made for communication apparatus #6, #7 and #8 as reservations allowing a multicast communication to be carried out from communication apparatus #7 to communication apparatus #6 and #8. Further, in the configuration, MAS 103 and MAS 104 are used for a communication based on the PCA technique as a communication from communication apparatus #8 to communication apparatus #7.

As is obvious from the above description, a communication based on the PCA technique can be carried out only by using a MAS not used for a DRP reservation. Thus, there is raised a problem that, in general, a MAS used for a DRP reservation cannot be used for carrying out a communication based on the PCA technique.

As a typical application of PCA reservations according to the embodiment, the configuration shown in FIG. 3 also includes the use of MAS 107 and 108 for reservations made in advance as reservations each allowing a communication based on the PCA technique to be carried out. To put it concretely, the typical setting allows the communication apparatus #5 to carry out a communication based on the PCA technique with each of the other communication apparatus, i.e., communication apparatus #1 to #4 and communication apparatus #6 to #8.

It is to be noted that, in accordance with the setting of the PCA reservations, while communication apparatus #5 does the setting initially, the other communication apparatus, i.e., communication apparatus #1 to #4 and communication apparatus #6 to #8, each also carry out a communication based on the PCA technique on an impartiality basis. For this reason, in a process to make a PCA reservation, an address showing a broadcast is set in target/owner device information, and the other communication apparatus also does setting in the same way. By making PCA reservations in this way, it is possible to assure a period for carrying out a communication based on the PCA technique on equal terms with a DRP reservation. It is to be noted that the target/owner device information will be described later by referring to FIG. 12.

Figure 4:
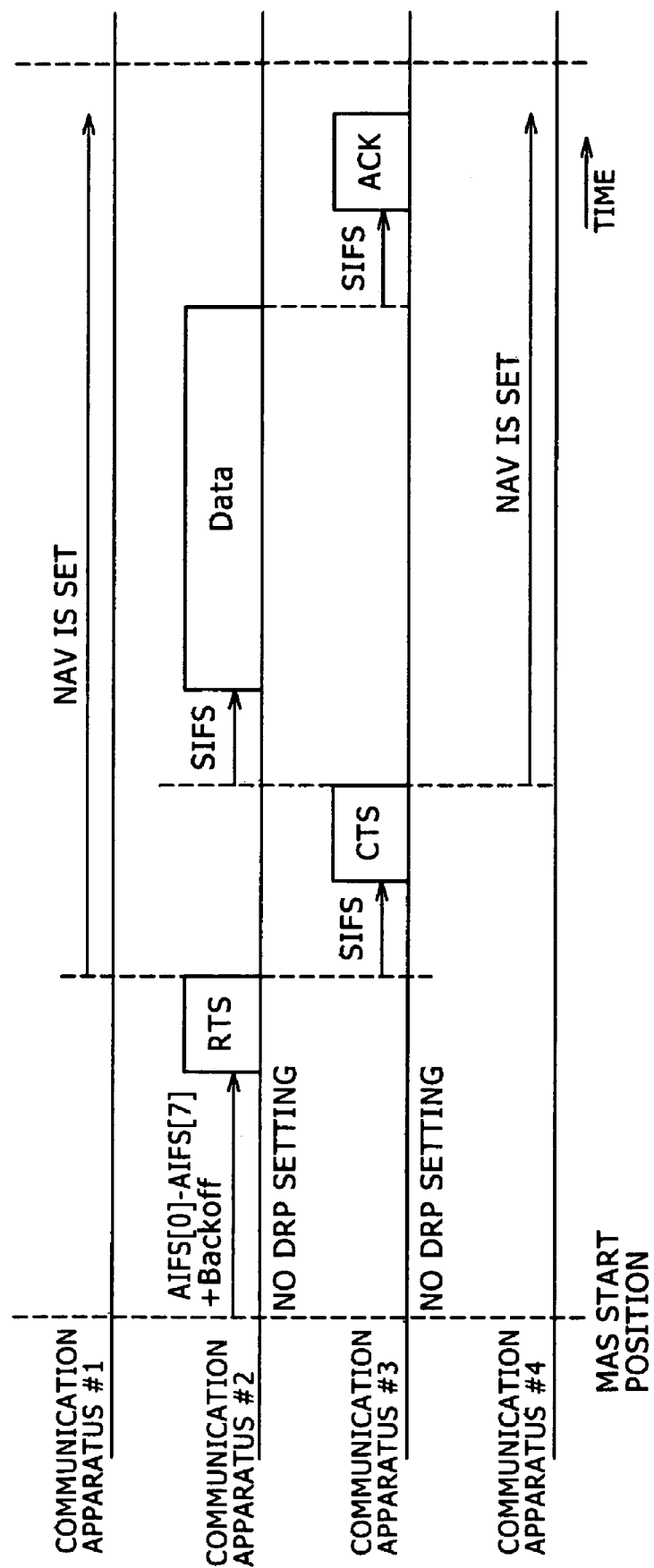
FIG. 4 is an explanatory diagram showing an embodiment implementing control of communications each based on a PCA technique.

(4) Embodiment of PCA Communication Control (Shown in FIG. 4)

FIG. 4 is a diagram showing an embodiment implementing control of communications each based on the PCA technique.

In the configuration of the embodiment defined as the conventional PCA communication control method, if another communication is not started after waiting for a period to lapse since the start position of a MAS, the utilization of which is defined as PCA utilization, its own communication can be carried out. The period is a sum obtained as a result of adding a backoff time to AIFS [0] to AIFS [7] shown respectively by access categories (0 to 7).

When data is to be transmitted from communication apparatus #2 to communication apparatus #3, after waiting for the sum of the backoff time and an AIFS time shown by an access category to lapse, communication apparatus #2 transmits an RTS (Request to Send) signal to communication apparatus #3.

Receiving the RTS (Request to Send) signal from communication apparatus #2, communication apparatus #3 responds to the RTS signal by transmitting a CTS (Clear to Send) signal to communication apparatus #2 after the lapse of an SIFS time.

In this configuration, communication apparatus #1 capable of sensing the RTS signal transmitted from communication apparatus #2 sets a NAV (Network Allocation Vector) and executes control not to carry out a communication till the communication between communication apparatus #2 and #3 ends.

By the same token, communication apparatus #4 capable of detecting the CTS signal transmitted from communication apparatus #3 sets a NAV (Network Allocation Vector) and executes control not to carry out a communication till the communication between communication apparatus #2 and #3 ends.

In this way, after the lapse of the SIFS time since the end of the process to inform communication apparatus surrounding communication apparatus #2 serving as an apparatus transmitting data and communication apparatus #3 serving as an apparatus receiving the data that the transmission line will be used as described above, communication apparatus #2 transmits the data to communication apparatus #3.

In addition, after the lapse of the SIFS time since the end of the process to transmit the data from communication apparatus #2 to communication apparatus #3, communication apparatus #3 transmits an ACK signal indicating acknowledgment of the reception of the data provided that the process to receive the data is completed.

As is obvious from the above description, there is raised a problem that communication apparatus #4 seen from communication apparatus #2 transmitting the RTS signal initially as a hidden apparatus is not capable of knowing that a PCA communication has been started during a redundant period, which ends when the CTS signal is received from communication apparatus #3.

Figure 5:
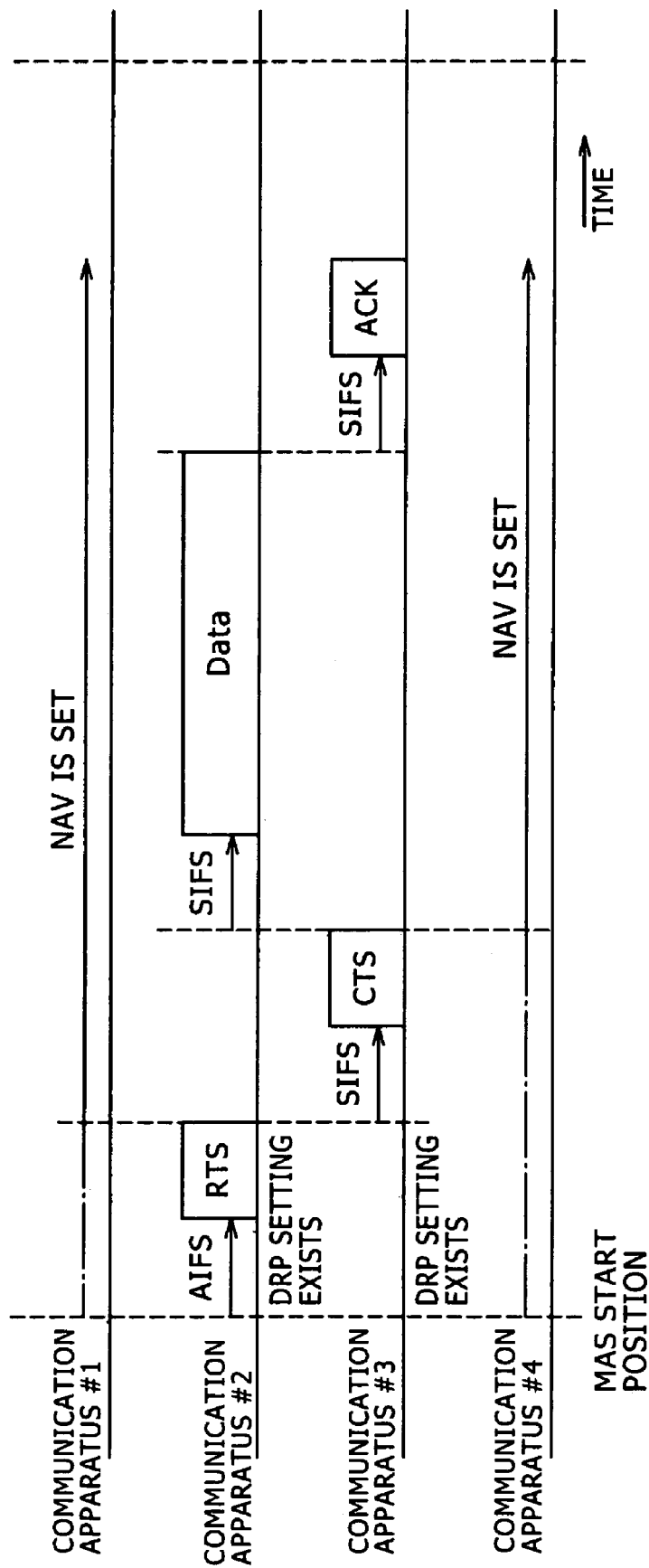
FIG. 5 is an explanatory diagram showing an embodiment implementing typical control of communications based on a soft DRP.

(5) Embodiment Implementing Control of Communications Based on a Soft DRP (Shown in FIG. 5)

FIG. 5 is a diagram showing an embodiment implementing control of communications based on a soft DRP. In the configuration of the embodiment defined as the conventional method of controlling communications based on a soft DRP, if another communication is not started after waiting for the AIFS [0] period to lapse since the start position of a MAS, the utilization of which is defined as a soft DRP, only a communication apparatus with DRP setting is allowed to carry out its own communication.

When data is to be transmitted from communication apparatus #2 to communication apparatus #3, after waiting for the AIFS time to lapse, communication apparatus #2 transmits an RTS (Request to Send) signal to communication apparatus #3.

Receiving the RTS (Request to Send) signal from communication apparatus #2, communication apparatus #3 responds to the RTS signal by transmitting a CTS (Clear to Send) signal to communication apparatus #2 after the lapse of an SIFS time.

In this configuration, communication apparatus #1 capable of sensing the RTS signal transmitted from communication apparatus #2 sets a NAV (Network Allocation Vector) and executes control not to carry out a communication till the communication between communication apparatus #2 and #3 ends.

By the same token, communication apparatus #4 capable of detecting the CTS signal transmitted from communication apparatus #3 sets a NAV (Network Allocation Vector) and executes control not to carry out a communication till the communication between communication apparatus #2 and #3 ends.

In this way, after the lapse of the SIFS time since the end of the process to inform apparatus surrounding communication apparatus #2 serving as an apparatus transmitting data and communication apparatus #3 serving as an apparatus receiving the data that the transmission line will be used as described above, communication apparatus #2 transmits the data to communication apparatus #3.

In addition, after the lapse of the SIFS time since the end of the process to transmit the data from communication apparatus #2 to communication apparatus #3, communication apparatus #3 transmits an ACK signal indicating acknowledgment of the reception of the data provided that the process to receive the data is completed.

It is to be noted that, after the control of the communication based on a soft DRP is completed, the control of the communication based on the PCA technique as described above can be carried out.

As an alternative, at a MAS for which a soft DRP has been set by surrounding communication apparatus, if it is not necessary to carry out a communication based on the PCA technique, in communication apparatus #1 and/or #4, a NAV (Network Allocation Vector) can be set over the entire MAS as shown by a dashed line in the figure to execute control not to carry out a communication till the communication between communication apparatus #2 and #3 ends.

As another alternative, it is possible to devise a method of carrying out a power-consumption reduction operation in a sleep state without setting its own utilization over the entire MAS.

Figure 6:
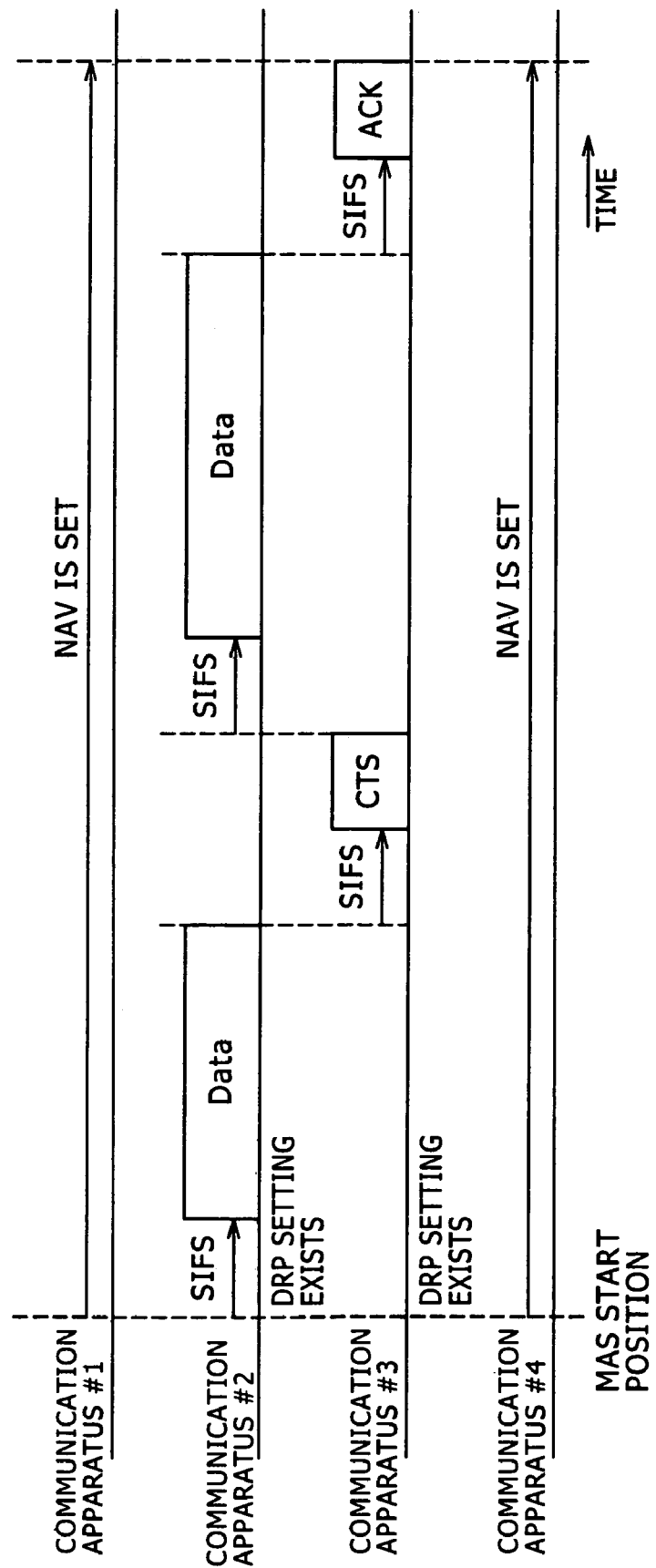
FIG. 6 is an explanatory diagram showing an embodiment implementing typical control of communications based on a hard DRP.

(6) Embodiment Implementing Control of Communications Based on a Hard DRP (Shown in FIG. 6)

FIG. 6 is a diagram showing an embodiment implementing typical control of communications based on a hard DRP. In the configuration of the embodiment defined as the conventional method of controlling communications based on a hard DRP, if another communication is not started after waiting for an SIFS period to lapse since the start position of a MAS, the utilization of which is defined as a hard DRP, only a communication apparatus with DRP setting is allowed to carry out its own communication.

When data is to be transmitted from communication apparatus #2 to communication apparatus #3, after waiting for the SIFS time to lapse, communication apparatus #2 transmits the data to communication apparatus #3.

In addition, after the lapse of the SIFS time since the end of the process to transmit the data from communication apparatus #2 to communication apparatus #3, communication apparatus #3 transmits an ACK signal indicating acknowledgment of the reception of the data provided that the process to receive the data is completed.

In this configuration, communication apparatus #1 capable of knowing the fact that a DRP reservation has been made in advance sets a NAV (Network Allocation Vector) throughout the entire MAS and executes control not to carry out a communication till the communication between communication apparatus #2 and #3 ends. By the same token, communication apparatus #4 capable of knowing the fact that a DRP reservation has been made in advance sets a NAV (Network Allocation Vector) throughout the entire MAS and executes control not to carry out a communication till the communication between communication apparatus #2 and #3 ends.

As another alternative, it is possible to devise a method of carrying out a power-consumption reduction operation in a sleep state without setting its own utilization over the entire MAS. As described above, if DRP setting exists, this configuration can carry out a communication after a relatively short wait time.

In consequence, there is raised a problem that, if a communication apparatus with DRP setting and a communication apparatus with PCA setting start communications in the same MAS, the communication of the communication apparatus with DRP setting is started, taking precedence of the communication of the communication apparatus with PCA setting. The following description explains a criterion provided for DRP and PCA reservations as a criterion for assuring execution of a PCA communication. The criterion is described by exemplification using a typical configuration for making a DRP or PCA reservation by finding the amount and type of data stored in a buffer, that is, by determining the priority of the transmission.

If the amount of data stored in a buffer prior to transmission to a specific communication apparatus is large, a DRP reservation for the specific apparatus is made in order to carry out a process to transmit the data stored in the buffer to the specific apparatus quickly. If data is stored in a buffer for transmission to all of a plurality of communication apparatus, a PCA reservation is made provided that the amount of stored data exceeds a predetermined quantity, and a data transmission process is carried out in order to transmit high-priority data by letting the data take precedence of other pieces of data.

Figure 7:
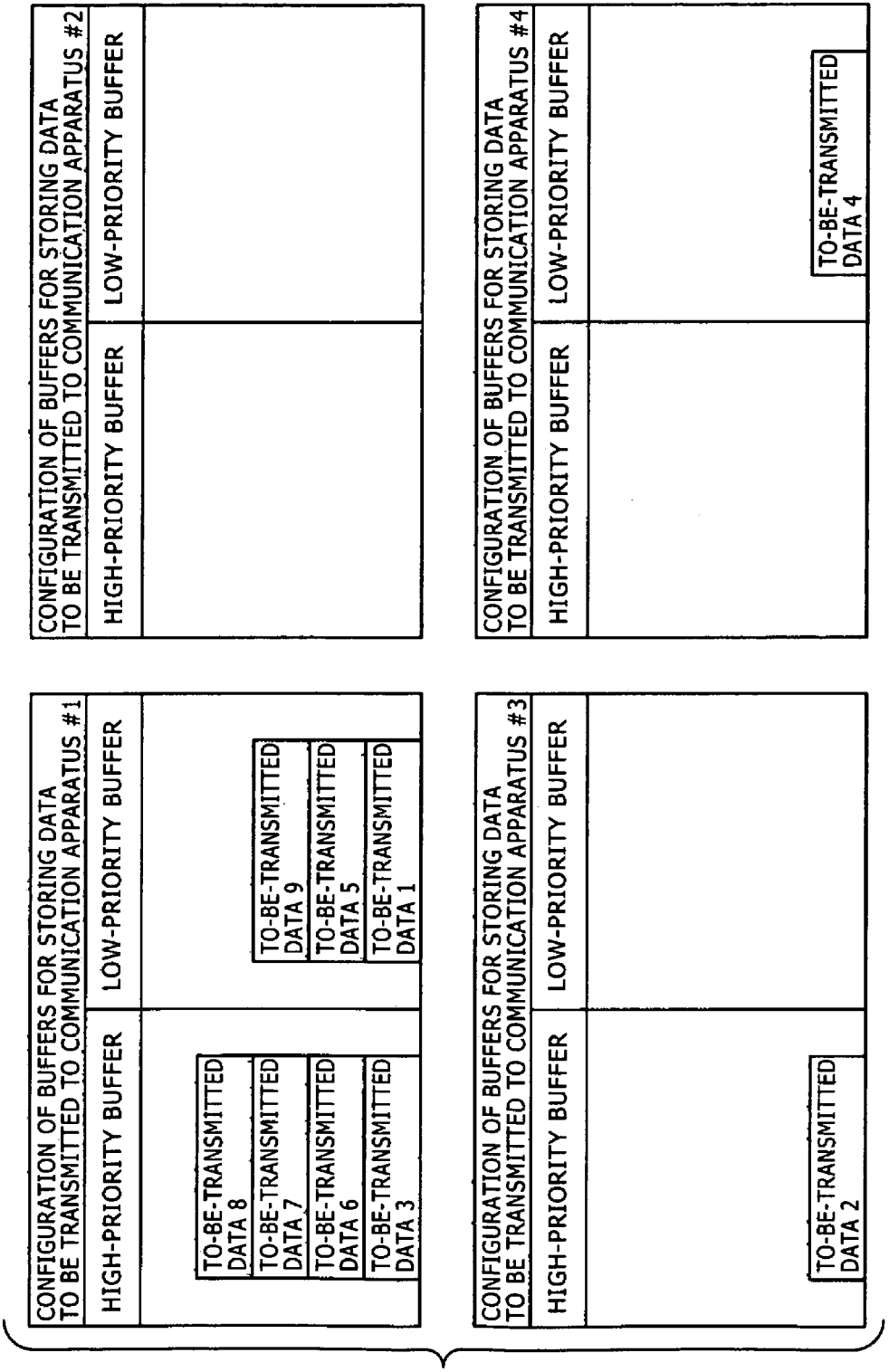
FIG. 7 is an explanatory diagram showing a typical criterion for making a DRP reservation.

(7) Criteria for Making DRP Reservations (Shown in FIG. 7)

FIG. 7 is a diagram showing a typical criterion for making a DRP reservation.

In an example shown in the figure, a high-priority buffer is used for storing pieces of data 3, 6, 7 and 8 to be transmitted to communication apparatus #1 whereas a low-priority buffer is used for storing pieces of data 1, 5 and 9 also to be transmitted to communication apparatus #1. Thus, a total of seven pieces of data have been stored in the buffers.

No data has been stored in buffers allocated to communication apparatus #2.

A high-priority buffer is used for storing a piece of data 2 to be transmitted to communication apparatus #3 whereas a low-priority buffer allocated to communication apparatus #3 contains no data yet. Thus, a total of one piece of data has been stored in the buffers.

A low-priority buffer is used for storing a piece of data 4 to be transmitted to communication apparatus #4 whereas a high-priority buffer allocated to communication apparatus #4 contains no data yet. Thus, a total of one piece of data has been stored in the buffers.

Since the pieces of data stored in the buffers allocated to communication apparatus #1 as data to be transmitted to communication apparatus #1 have reached a predetermined number of seven, a decision is made to make a DRP reservation for communications with communication apparatus #1 due to a need for transmission of the data to communication apparatus #1 to take precedence of other communications.

Figure 8:
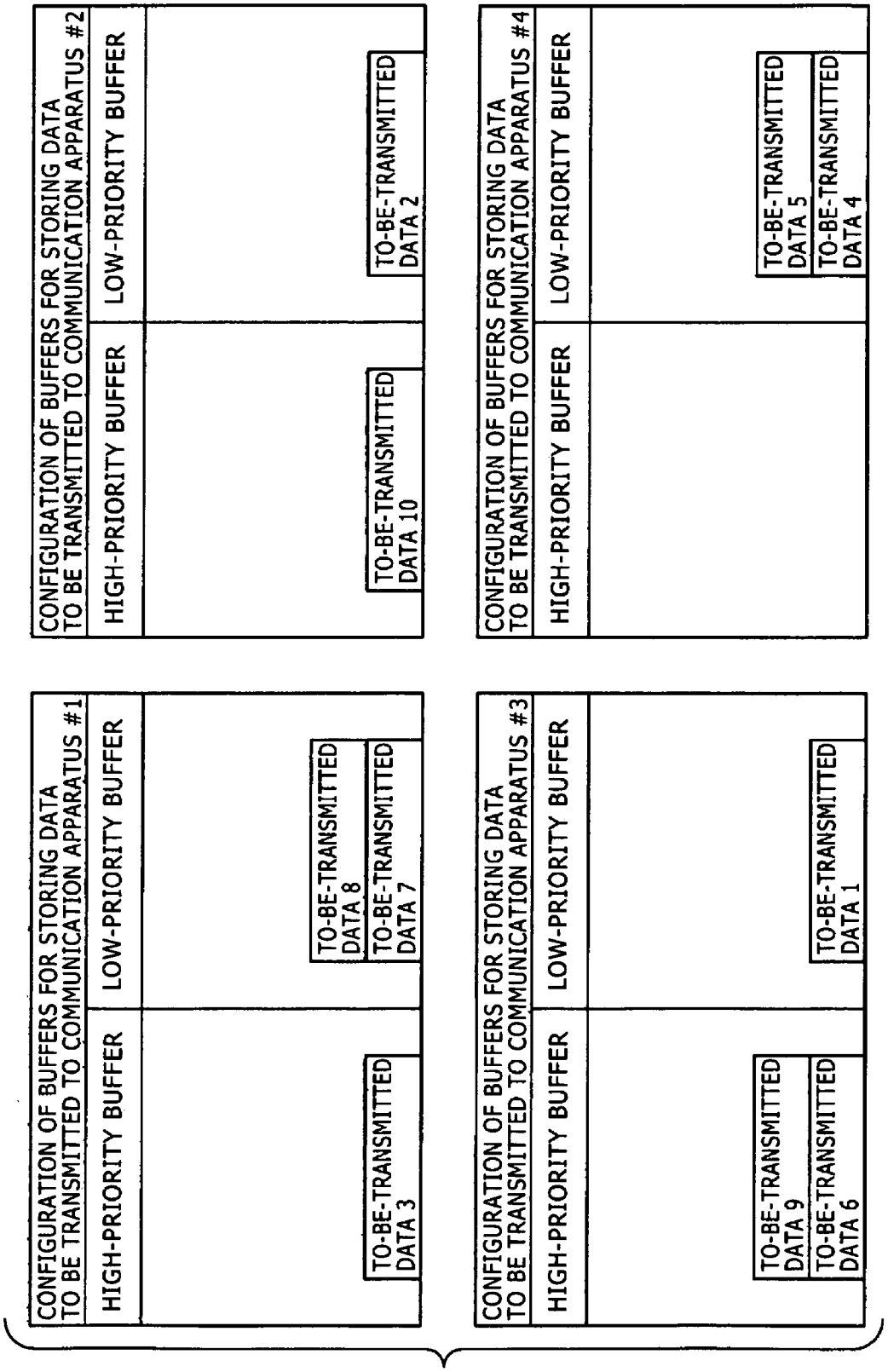
FIG. 8 is an explanatory diagram showing a typical criterion for making a PCA reservation.

(8) Criteria for Making PCA Reservations (Shown in FIG. 8)

FIG. 8 is a diagram showing a typical criterion for making a PCA reservation.

In an example shown in the figure, a high-priority buffer is used for storing a piece of data 3 to be transmitted to communication apparatus #1 whereas a low-priority buffer is used for storing pieces of data 7 and 8 also to be transmitted to communication apparatus #1. Thus, a total of three pieces of data have been stored in the buffers.

A high-priority buffer is used for storing a piece of data 10 to be transmitted to communication apparatus #2 whereas a low-priority buffer is used for storing a piece of data 2 to be transmitted to communication apparatus #2. Thus, a total of two pieces of data have been stored in the buffers.

A high-priority buffer is used for storing pieces of data 6 and 9 to be transmitted to communication apparatus #3 whereas a low-priority buffer is used for storing a piece of data 1 also to be transmitted to communication apparatus #3. Thus, a total of three pieces of data have been stored in the buffers.

A high-priority buffer allocated to communication apparatus #4 contains no data whereas a low-priority buffer allocated to communication apparatus #4 is used for storing pieces of data 4 and 5. Thus, a total of two pieces of data have been stored in the buffers.

As is obvious from the description of the example shown in the figure, a total of ten pieces of data have been stored in the buffers but not concentrated on buffers allocated to a particular communication apparatus. Under this condition, a decision is made to make PCA reservations required for a need to transmit data on a priority basis.

Figure 9:
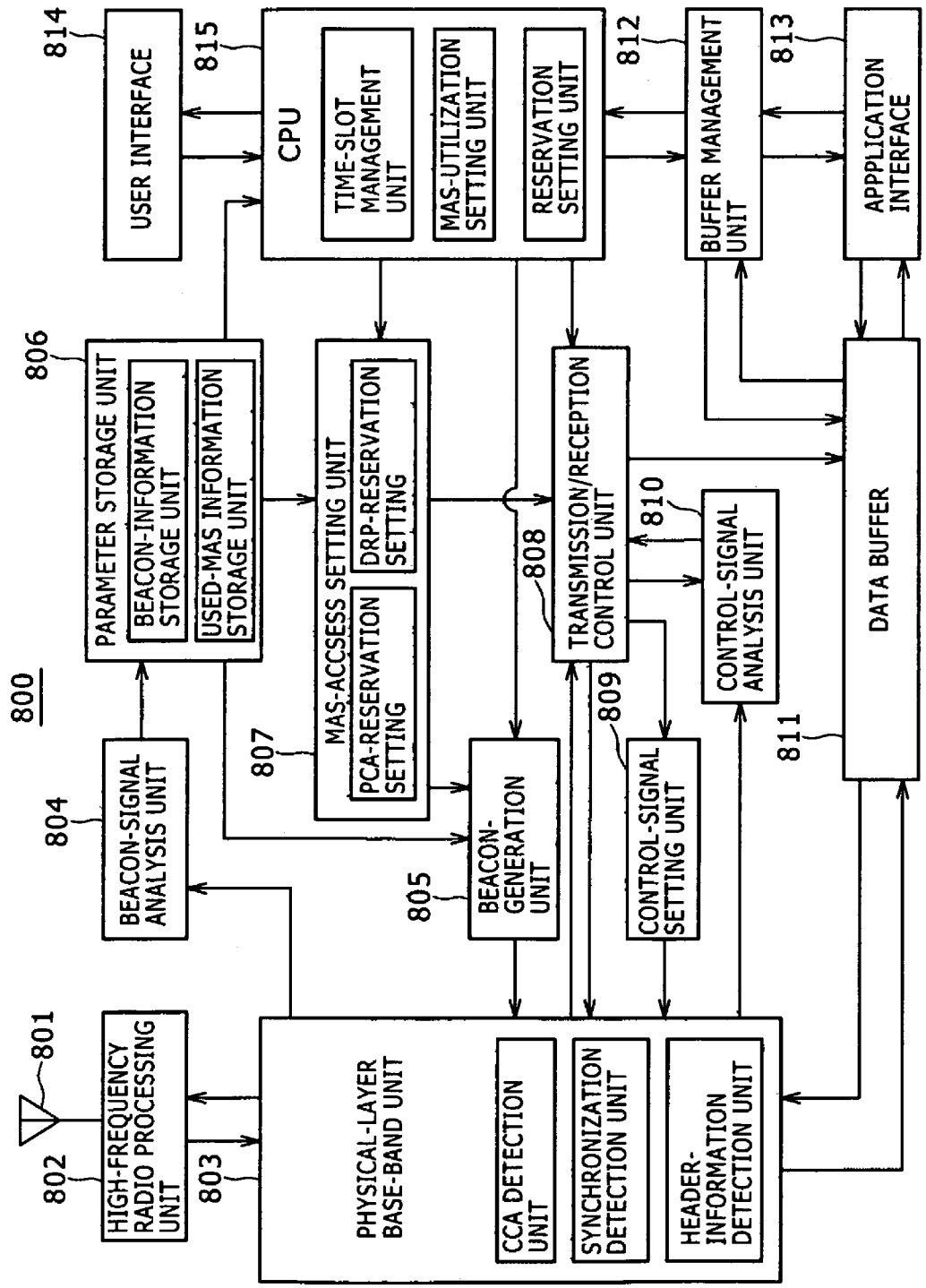
FIG. 9 is an explanatory diagram showing a typical configuration of a radio communication apparatus.

(9) Typical Configuration of the Radio Communication Apparatus (Shown in FIG. 9)

FIG. 9 is a diagram showing a typical configuration of the radio communication apparatus 800 according to the embodiment.

As shown in FIG. 9, the radio communication apparatus 800 includes an antenna 801, a high-frequency radio processing unit 802 and a physical-layer base-band unit 803. The antenna 801 is a component for transmitting and receiving predetermined high-frequency radio signals to and from the radio communication media. The high-frequency radio processing unit 802 is a component for amplifying a high-frequency radio signal received from the radio communication media by the antenna 801, converting the amplified high-frequency radio signal into a received signal, amplifying a signal to be transmitted to the radio communication media by way of the antenna 801 and converting the amplified signal to be transmitted into a high-frequency radio signal. The physical-layer base-band unit 803 is a component for carrying out a predetermined demodulation process on a received signal output by the high-frequency radio processing unit 802 in order to construct information bits and carrying out a predetermined modulation process on information bits to be transmitted in order to generate a signal to be transmitted to the radio communication media.

The physical-layer base-band unit 803 includes a CCA (Clear Channel Assessment) detection unit, a synchronization detection unit and a header-information detection unit, which are each used for execution of access control. The CCA detection unit is also known as a carrier detection unit.

The radio communication apparatus 800 includes a beacon-signal analysis unit 804, a beacon generation unit 805 and a parameter storage unit 806. The beacon-signal analysis unit 804 is a component for analyzing beacon signals transmitted by communication apparatus surrounding the radio communication apparatus 800. The beacon generation unit 805 is a component for generating a beacon to be transmitted by the radio communication apparatus 800. The parameter storage unit 806 is a component for storing information conveyed in colleted beacons and information on periods during which the surrounding communication apparatus operate as hosts.

The radio communication apparatus 800 according to the present embodiment has a MAS-access control unit 807 for setting predetermined access control for every predetermined MAS (Media Access Slot). The MAS-access control unit 807 includes a PCA-reservation setting unit for making a PCA reservation and a DRP-reservation setting unit for making a DRP reservation.

The radio communication apparatus 800 also includes a transmission/reception control unit 808 for executing transmission/reception control based on a predetermined access control method in accordance with a command issued by the MAS-access control unit 807.

The radio communication apparatus 800 further includes a control-signal setting unit 809 and a control-signal analysis unit 810. The control-signal setting unit 809 is a component for setting transmission of an access control signal such as an RTS or CTS signal. The control-signal analysis unit 810 is a component for analyzing a received access control signal such as the RTS or CTS signal.

The radio communication apparatus 800 also includes a data buffer 811, a buffer management unit 812 and an application interface 813. The data buffer 811 is a component used for temporarily storing data to be transmitted and received data. The buffer management unit 812 is a component for managing storage locations in the data buffer 811. The application interface 813 is a component for receiving data transmitted by an application apparatus connected to the radio communication apparatus 800 and delivering received data to an application apparatus.

The radio communication apparatus 800 further includes a user interface 814 and a CPU 815. The user interface 814 is a component for showing the operating state of the radio communication apparatus 800 to the user and accepting a command issued by the user. The CPU 815 has a time-slot management unit, a MAS-utilization setting unit and a reservation setting unit, which are used for managing a series of operations carried out by the radio communication apparatus 800 as pieces of internal information.

Figure 10:
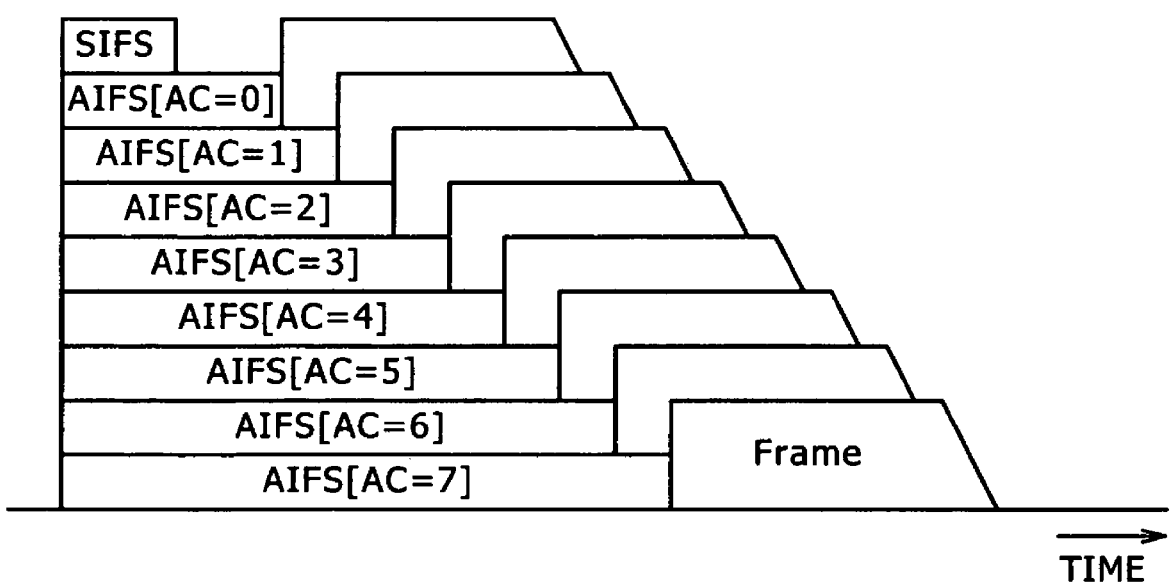
FIG. 10 is an explanatory diagram showing a typical configuration of an AIFS time for each access category.

(10) Typical Configuration of an AIFS Time for Each Access Category (Shown in FIG. 10)

FIG. 10 is a diagram showing a typical configuration of an AIFS time for each access category.

The figure shows relations between an SIFS time and an AIFS time. The SIFS time is a minimum gap in processes to transmit and receive data. The SIFS time varies in accordance with the access category of the data in an access based on contentions. In the configuration shown in the figure, AIFS [0] is a sum of a possible minimum redundant time and the SIFS time, which is a minimum gap in processes to transmit and receive data as described above. AIFS [0] corresponds to a transmission wait time for an AC (Access Category) of 0.

AIFS [1] is a sum of AIFS [0] and another redundant time. AIFS [1] corresponds to a transmission wait time for an AC (Access Category) of 1.

AIFS [2] is a sum of AIFS [1] and another redundant time. AIFS [2] corresponds to a transmission wait time for an AC (Access Category) of 2.

By the same token, each other redundant transmission wait time is set in accordance with the priority level of the AC (Access Category). To put it concretely, AIFS [3], AIFS [4], AIFS [5], AIFS [6] and AIFS [7] are set as transmission wait times for ACs (Access Categories) of 3, 4, 5, 6 and 7 respectively.

Figure 11:
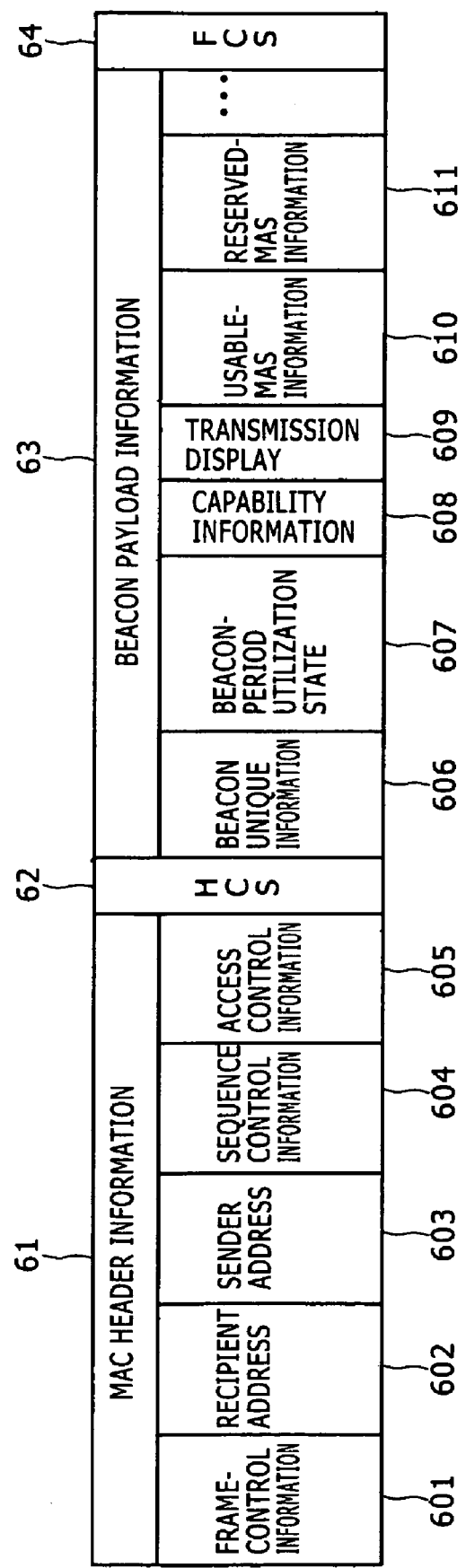
FIG. 11 is an explanatory diagram showing a typical configuration of a beacon frame.

(11) Typical Configuration of a Beacon Frame (Shown in FIG. 11)

FIG. 11 is a diagram showing a typical configuration of a beacon frame.

This beacon frame is transmitted to each communication apparatus during a beacon period used as a management period of a super frame. By receiving this beacon frame, the surrounding communication apparatus are capable of exchanging parameters with the communication apparatus transmitting the beacon frame.

The structure of the beacon frame includes MAC-header information 61, a header check sequence (HCS) 62, beacon-payload information 63 and a frame check sequence (FCS) 64.

The MAC-header information 61 includes frame-control information 601, a recipient address 602, which is the address of the recipient of the beacon, a sender address 603, which is the address of the transmitter of the beacon, sequence control information 604 such as a sequence number and access control information 605 describing a parameter required in access control.

The beacon-payload information 63 includes beacon unique information 606, a beacon-period utilization state 607, capability information 608, a transmission display 609, usable-MAS information 610 and reserved-MAS information 611. The beacon unique information 606 is a parameter unique to the communication apparatus. The beacon-period utilization state 607 is information indicating the utilization of a beacon slot. The capability information 608 is information indicating the capability of the communication apparatus. The transmission display 609 is information indicating the existence of data to be transmitted to the recipient of the beacon. The usable-MAS information 610 is information indicating the position of a usable MAS. The reserved-MAS information 611 is information used for reporting the position of a MAS, the utilization of which has been reserved.

It is to be noted that the beacon frame can be configured in such a condition that information elements included in the beacon-payload information 63 deleted or added if necessary.

Figure 12:
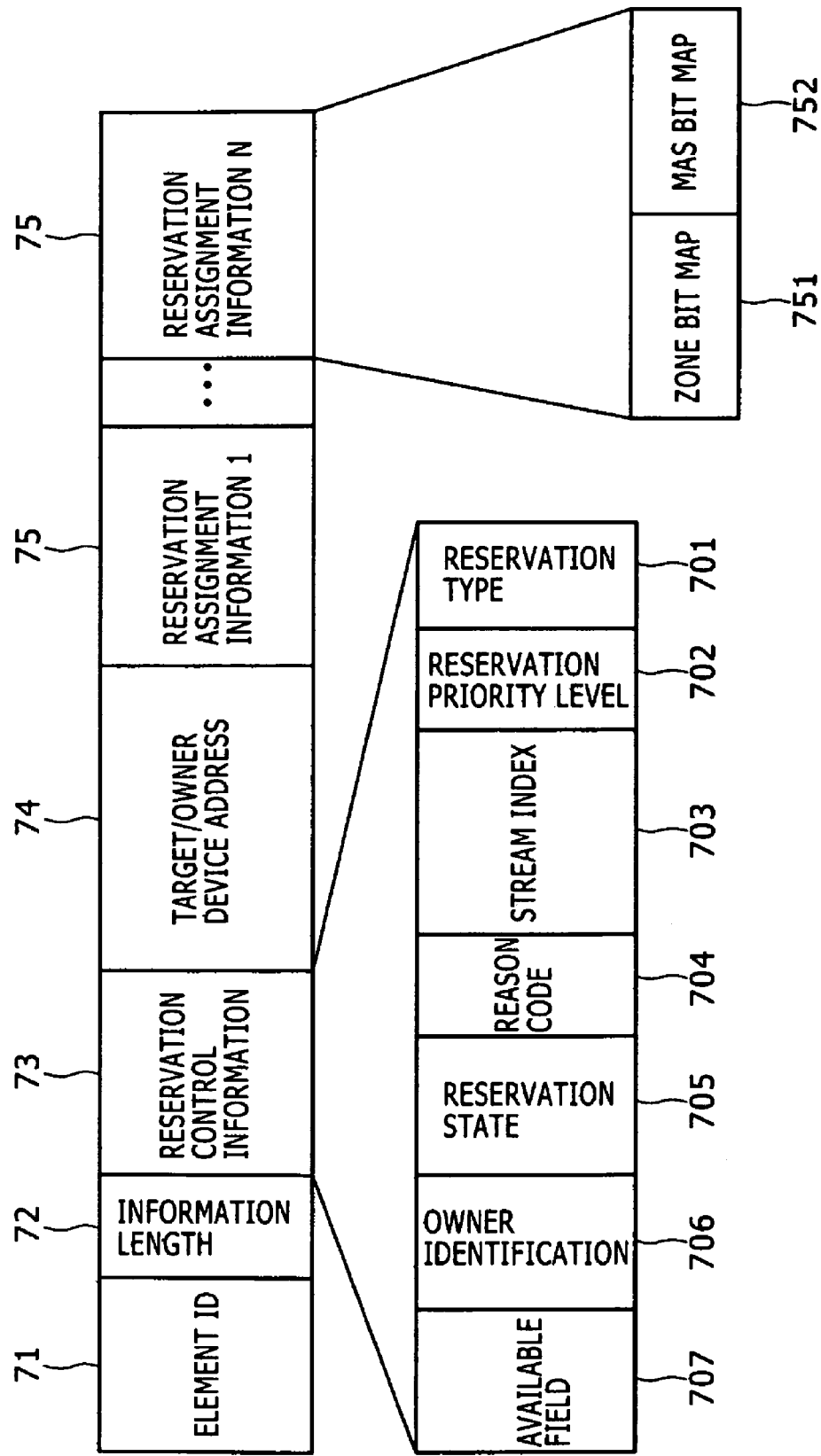
FIG. 12 is an explanatory diagram showing a typical configuration of reserved MAS information.

(12) Typical Configuration of the Reserved MAS Information (Shown in FIG. 12)

FIG. 12 is a diagram showing a typical configuration of the reserved MAS information 611. Elements of the reserved-MAS information 611 include an element ID 71, an information length 72, reservation control information 73, a target/owner device address 74, pieces of information (reservation assignment information 1 to N) 75. The element ID 71 is an ID identifying this reserved MAS used as an information element. The information length 72 is the length of this reserved MAS element. The reservation control information 73 is an element showing information on control of reservations. The target/owner device address 74 is an element used for identifying a communication apparatus serving as the object of reservation. The pieces of reservation assignment information 75 indicate a MAS already reserved.

The reservation control information 73 includes a reservation type 701, a reservation priority level 702, a stream index 703, a reason code 704, a reservation state 705, an owner identification 706 and an available field 707. The reservation type 701 is information indicating the type of the reservation. The reservation priority level 702 is information indicating the priority level of the reservation. The stream index 703 is information identifying the unit of the reservation. The reason code 704 is a code in a process to adjust the reservation. The reservation state 705 is information indicating whether or not an adjustment process is being carried out. The owner identification 706 is information indicating the owner. The available field 707 is a reserved space for future expansions.

The pieces of reservation assignment information 75, which are denoted by reference numerals 1 to N, each include a zone bit map 751 and a MAS bit map 752. Let us assume that every 16 MASes form a zone. In this case, the zone bit map 751 is information indicating which zone this reserved MAP pertains to and the MAS bit map 752 is information indicating which MAS pertaining in the zone indicated by the zone bit map 751 has been reserved.

(13) Typical Description of the Reservation Type (Shown in FIG. 13)

FIG. 13 is a diagram showing typical description of the reservation type. As the conventional reservation type, a value of 0 indicates other beacon period, a value of 1 indicates a hard DRP reservation, a value of 2 indicates a soft DRP reservation and a value of 3 indicates a private reservation. The configuration including a new reservation-type value of 4 indicating a PCA reservation is peculiar to this embodiment. As an alternative, it is also possible to think of a method implementing control of communications based on the PCA reservation in accordance with the embodiment by using the private reservation with a value of 3 as a reservation type in the category.

(14) Typical Description of the Reason Code (Shown in FIG. 14)

FIG. 14 is a diagram showing typical description of the reason code. The figure shows actual values of the reason code in a process to adjust the reservation, being related to a reservation state showing that a reservation is being adjusted at the present time. A value of 0 indicates a case in which a request for a DRP reservation has been confirmed, a value of 1 indicates a case in which DRP reservation contention has occurred, a value of 2 indicates a case in which a request for a DRP reservation has been started, a value of 3 indicates a case in which a request for a DRP reservation has been discarded and a value of 4 indicates a case in which a request for a DRP reservation is being adjusted.

Figure 15:
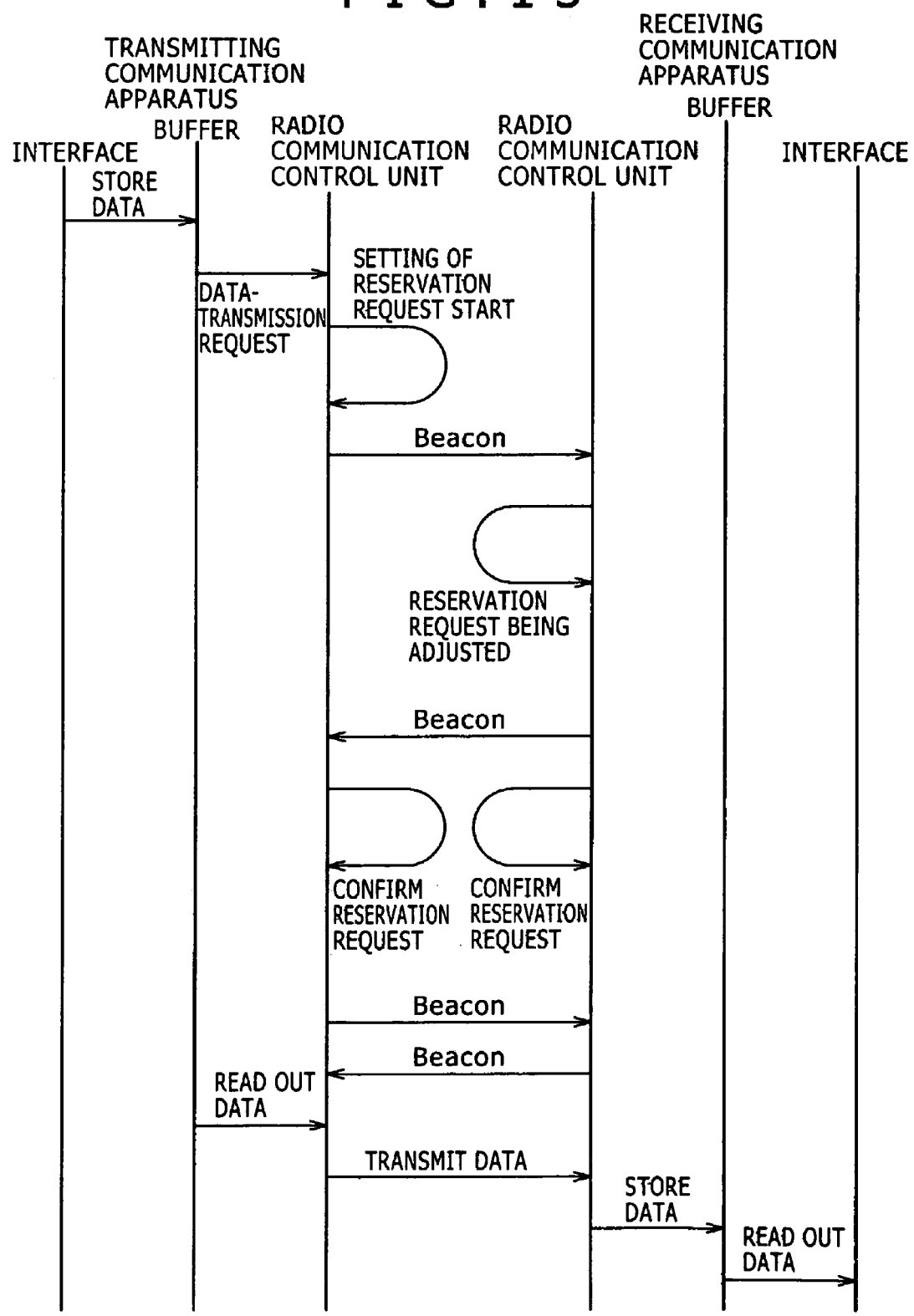
FIG. 15 is a diagram showing a typical communication sequence of a process to make a DRP reservation.

(15) Communication Sequence of a DRP Reservation (Shown in FIG. 15)

FIG. 15 is a diagram showing a typical communication sequence of a process to make a DRP reservation.

First of all, after data is stored in a buffer through an interface, a request for transmission of the data is supplied to a radio communication control unit. In this case, the start of a request to be issued to a receiving communication apparatus as a request for a reservation is set and a beacon describing the setting of the start is transmitted to the receiving communication apparatus. The radio communication control unit has a configuration shown in FIG. 9 and corresponds to the transmission/reception control unit 808 described earlier.

In the data receiving communication apparatus receiving the beacon on the other hand, the request for a reservation is adjusted. Then, the data receiving communication apparatus transmits a beacon signal including a parameter such as information on a MAS that can be set for a DRP reservation.

If both the transmitting communication apparatus and the receiving communication apparatus agree with each other, the request for a reservation is confirmed and the transmitting communication apparatus and the receiving communication apparatus exchange beacon signals including a parameter such as information on a MAS to be used in the transmission of the data.

Then, as the position of the MAS arrives, the transmitting communication apparatus transmits the data to the receiving communication apparatus in accordance with a predetermined access procedure.

The data receiving communication apparatus stores the received data in a buffer and, then, outputs the data with a proper timing by way of an interface.

Thereafter, the DRP reservation is continued till data to be transmitted from the transmitting communication apparatus to the receiving communication apparatus is exhausted.

Figure 16:
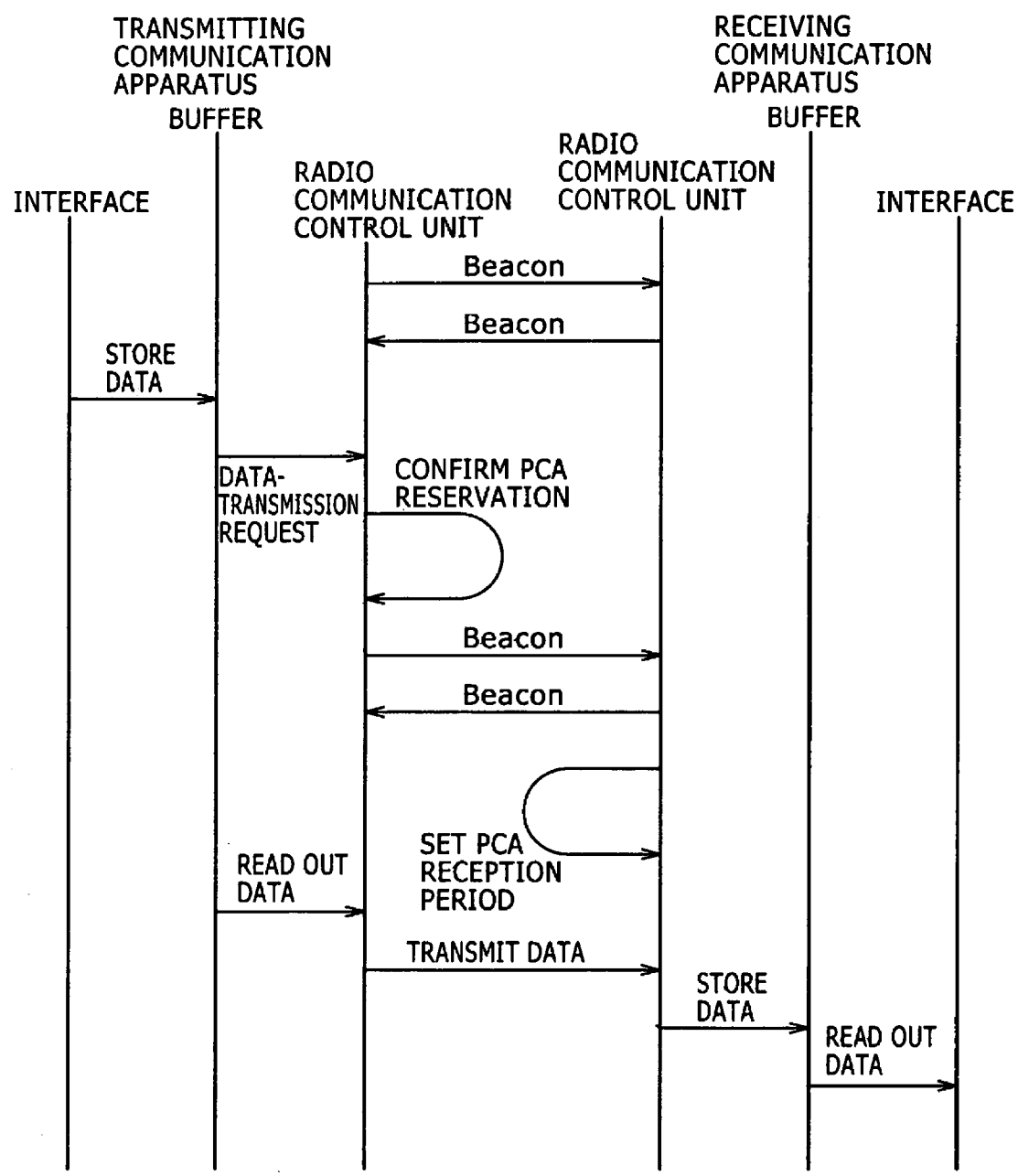
FIG. 16 is a diagram showing a typical communication sequence of a process to make a PCA reservation.

(16) Communication Sequence for a PCA Reservation (Shown in FIG. 16)

FIG. 16 is a diagram showing a typical communication sequence of a process to make a PCA reservation.

In this sequence, beacon signals are exchanged between the transmitting and receiving communication apparatus in advance in order to exchange information on a usable MAS.

First of all, after data is stored in a buffer through an interface, a request for transmission of the data is supplied to a radio communication control unit. In this case, the transmitting communication apparatus refers to information on a MAS that can be used by the receiving communication apparatus to confirm the MAS for making a PCA reservation. Then, the transmitting communication apparatus transmits a beacon signal including a parameter such as information on the PCA reservation to the receiving communication apparatus.

In the data receiving communication apparatus receiving the beacon on the other hand, the parameter such as information on the PCA reservation is referred to and the MAS for making a PCA reservation is identified in order to set reception of data.

Then, as the position of the MAS arrives, the transmitting communication apparatus transmits the data to the receiving communication apparatus in accordance with a predetermined access procedure.

The data receiving communication apparatus stores the received data in a buffer and, then, outputs the data with a proper timing by way of an interface.

Since the PCA reservation is made in super-frame units, it is necessary to make a PCA reservation for the next super frame and set the reservation every time the reservation is made.

Figure 17:
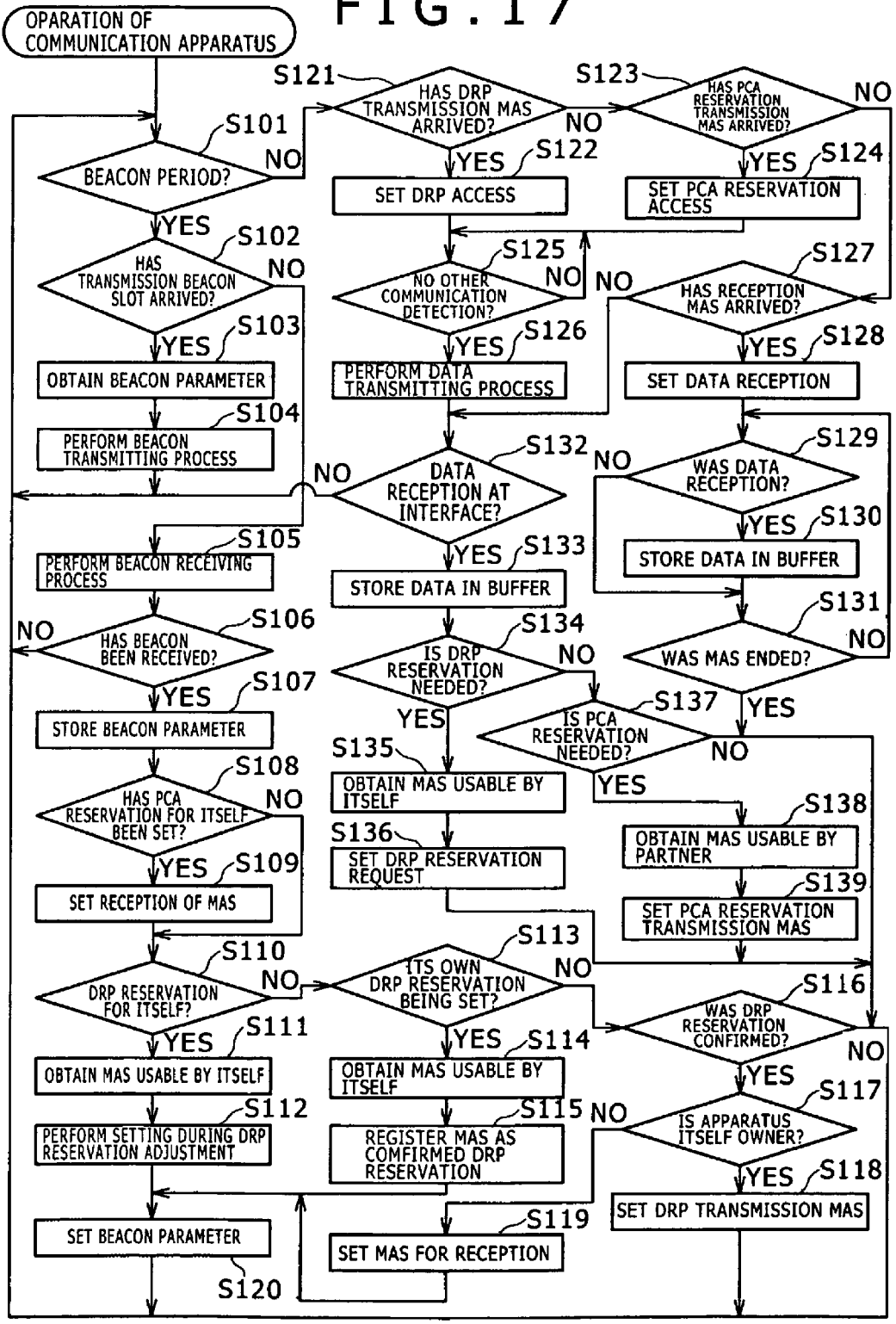
FIG. 17 is a diagram showing the flow of the operation carried out by a radio communication apparatus.

(17) Flow of the Operation Carried Out by a Radio Communication Apparatus Shown in FIG. 17)

FIG. 17 is a diagram showing the flow of the operation carried out by a radio communication apparatus.

First of all, at a step S101, the radio communication apparatus produces a result of determination as to whether or not the present period is a beacon period in a super frame period of its own. If the result of the determination indicates that the present period is a beacon period, the operation flow goes on to a step S102 at which the radio communication apparatus produces a result of determination as to whether or not the position of a transmission beacon slot has arrived. If the result of the determination indicates that the position of a transmission beacon slot has arrived, the operation flow goes on to a step S103 at which the radio communication apparatus obtains the parameter of a beacon to be transmitted. Then, at the next step S104, the radio communication apparatus transmits the beacon to a receiving radio communication apparatus. If the determination result produced at the step S102 indicates that the arriving beacon slot is not a transmission beacon slot, on the other hand, the operation flow goes on to a step S105 at which the radio communication apparatus carries out a process to receive a beacon. Then, at the next step S106, the radio communication apparatus produces a result of determination as to whether or not a beacon has been received. If the result of the determination indicates that a beacon has been received, the operation flow goes on to a step S107 at which the radio communication apparatus stores the parameter of the received beacon in a memory.

Then, at the next step S108, the radio communication apparatus produces a result of determination as to whether or not a PCA reservation for the apparatus itself has been made. If the result of the determination indicates that a PCA reservation for the apparatus itself has been made, the operation flow goes on to a step S109 at which the radio communication apparatus sets the corresponding MAS reception. Then, the operation flow goes on to a step S110. If the result of the determination at the step S108 indicates that no PCA reservation for the apparatus itself has been made, on the other hand, the operation flow goes on to the step S110.

Then, at the step S110, the radio communication apparatus produces a result of determination as to whether or not a DRP reservation for the apparatus itself has been made. If the result of the determination indicates that a DRP reservation for the apparatus itself has been made, the operation flow goes on to a step S111 at which the radio communication apparatus obtains information on the position of a MAS that can be used by the apparatus itself. Then, at the next step S112, the radio communication apparatus sets the MAS in status of DRP reservation adjustment. Subsequently, at the next step S120, the radio communication apparatus sets the parameter of a beacon to be transmitted.

If the determination result produced at the step S110 indicates that no DRP reservation for the apparatus itself has been made, on the other hand, the operation flow goes on to a step S113 at which the radio communication apparatus produces a result of determination as to whether or not a DRP reservation for the apparatus itself is being made. If the result of the determination indicates that a DRP reservation for the apparatus itself is being made, the operation flow goes on to a step S114 at which the radio communication apparatus obtains information on the position of a MAS that can be used by the apparatus itself. Then, at the next step S115, the radio communication apparatus registers the MAS for actually making the DRP reservation as a MAS with a confirmed DRP reservation. Subsequently, at the next step S120, the radio communication apparatus sets the parameter of a beacon to be transmitted.

If the determination result produced at the step S113 indicates that no DRP reservation for the apparatus itself is being made, on the other hand, the operation flow goes on to a step S116 at which the radio communication apparatus produces a result of determination as to whether or not a DRP reservation for the apparatus itself has been confirmed. If the result of the determination indicates that a DRP reservation for the apparatus itself has been confirmed, the operation flow goes on to a step S117 at which the radio communication apparatus produces a result of determination as to whether or not the radio communication apparatus itself is the owner. If the result of the determination indicates that the radio communication apparatus itself is the owner, the operation flow goes on to a step S118 at which the radio communication apparatus sets the MAS used for setting the reservation as a MAS for a DRP transmission. If the result of the determination indicates that the radio communication apparatus itself is the target, on the other hand, the operation flow goes on to a step S119 at which the radio communication apparatus sets the MAS used for setting the reservation as a MAS for a reception. Subsequently, at the next step S120, the radio communication apparatus sets the parameter of a beacon to be transmitted.

If the determination result produced at the step S101 indicates that the present period is not a beacon period in a super frame period of the radio communication apparatus itself, on the other hand, the operation flow goes on to a step S121 at which the radio communication apparatus produces a result of determination as to whether or not a MAS for a DRP transmission has arrived in the super frame period. If the result of the determination indicates that a MAS for a DRP transmission has arrived in the super frame period, the operation flow goes on to a step S122 at which the radio communication apparatus sets the start time of the corresponding DRP access. Then, the operation flow goes on to a step S125 to be described later.

If the determination result produced at the step S121 indicates that no MAS for a DRP transmission has arrived in the super frame period, on the other hand, the operation flow goes on to a step S123 at which the radio communication apparatus produces a result of determination as to whether or not a PCA reservation transmission MAS has arrived. If the result of the determination indicates that a PCA reservation transmission MAS has arrived, the operation flow goes on to a step S124 at which the radio communication apparatus sets a PCA reservation access. Then, at the next step S125 mentioned earlier, the radio communication apparatus produces a result of determination as to whether or not another communication has been detected. If the result of the determination indicates that another communication has been detected, the operation flow goes back to the step S125 to repeat the process of the step. If the result of the determination indicates that no other communication has been detected, on the other hand, the operation flow goes on to a step S126 at which the radio communication apparatus carries a process to transmit data. Then, the operation flow goes on to a step S132 to be described later. If the determination result produced at the step S123 indicates that no PCA reservation transmission MAS has arrived, on the other hand, the operation flow goes on to a step S127 at which the radio communication apparatus produces a result of determination as to whether or not a MAS for a reception has arrived. If the result of the determination indicates that a MAS for reception has arrived, the operation flow goes on to a step S128 at which the radio communication apparatus carries out a process to receive data. Then, at the next step S129, the radio communication apparatus produces a result of determination as to whether or not the data has been received. If the result of the determination indicates that the data has been received, the operation flow goes on to a step S130 at which the radio communication apparatus stores the data in a buffer. Then, the operation flow goes on to a step S131. If the result of the determination indicates that no data has been received, on the other hand, the operation flow goes on to the step S131.

Then, at the step S131, the radio communication apparatus produces a result of determination as to whether or not the MAS has ended. If the result of the determination indicates that the MAS has not ended, the processes of the steps S129 and S130 are repeated. As a matter of fact, the processes of the steps S129 and S130 are carried out repeatedly till the result of the determination indicates that the MAS has ended. As the result of the determination indicates that the MAS has ended, the operation flow goes back to the step S101.

If the determination result produced at the step S127 indicates that a MAS for reception has not arrived, on the other hand, the operation flow also goes on to the aforementioned step S132 at which the radio communication apparatus produces a result of determination as to whether or not data has been received at an interface from an application with any timing. If the result of the determination indicates that data has been received, the operation flow goes on to a step S133 at which the radio communication apparatus stores the data in a buffer. Then, at the next step S134, the radio communication apparatus produces a result of determination as to whether or not a DRP reservation is required. If the result of the determination indicates that a DRP reservation is required, the operation flow goes on to a step S135 at which the radio communication apparatus obtains information on a MAS that can be used by the apparatus itself. Then, at the next step S136, the radio communication apparatus sets a request for a DRP reservation. If the determination result produced at the step S134 indicates that a DRP reservation is not required, on the other hand, the operation flow goes on to a step S137 at which the radio communication apparatus produces a result of determination as to whether or not a PCA reservation is required. If the result of the determination indicates that a PCA reservation is required, the operation flow goes on to a step S138 at which the radio communication apparatus obtains information on a MAS that can be used by the communication partner. Then, at the next step S139, the radio communication apparatus sets PCA reservation transmission MAS.

After the step S104, S120, S118, S136 or S139, the operation flow goes back to the step S101 to repeat the processes described above. The operation flow also goes back to the step S101 if the determination result produced at the step S106, S116, S132 or S137 is a denial.

The configuration and operation of the radio communication apparatus according to the embodiment have been described above. By incorporating a computer program for implementing the functions of the radio communication apparatus in a computer for executing the program, the computer is capable of functioning as the radio communication apparatus. The computer program can be distributed in the market through a recording medium used for recording the program or by downloading the program from a source by way of an electronic network. An example of the recording medium used for recording the computer program is a CD-ROM.

According to the embodiment described above, the following effects can be obtained.

In order to implement the PCA (Prioritized Channel Access) technique in a stable manner, a reservation based on the DRP (Distributed Reservation Protocol) is made and then, in the reserved period, a communication based on the PCA technique is carried out.

It is thus possible to implement a method of carrying out a communication based on the PCA technique in a stable manner after making a reservation based on the DRP (Distributed Reservation Protocol) in the reserved period without disturbing communications in another communication system or in another network.

It is also possible to provide a radio communication apparatus with a method of carrying out a communication based on the PCA technique in a stable manner without being blocked by the DRP of another communication apparatus even if the radio communication apparatus exists at a place physically adjacent to the other communication apparatus pertaining to another network.

It is possible to provide a method to effectively transfer setting of contention-based accesses to a hidden terminal by making a reservation for executing control of contention-based accesses and reporting the reservation by means of a beacon signal in advance.

It is possible to implement a method to make a reservation for executing control of contention-based accesses more easily than the ordinary reservation transmission protocol by making the reservation in accordance with a predetermined sequence.

If a demand for a communication is raised, a time that can be used by a receiving radio communication apparatus is reserved on the basis of information reported by a beacon signal in advance as information on usable times so as to allow the reservation to be made in a short period of time.

By temporarily making a reservation only within one super frame in order to execute control of contention-based accesses, it is possible to implement an effective reservation protocol without wasteful reservation setting having effects on later processes.

By referring to diagrams, the above description has explained preferred embodiments implementing a radio communication system provided by the present invention, a radio communication apparatus employed in the system and a computer program implementing the functions of the apparatus. However, the scope of the present invention is not limited to the embodiments. It is obvious that a person skilled in the art is capable of coming up with a variety of typical changes and typical corrections within the technological and conceptual categories described in claims appended to the patent specification. However, such changes and corrections are naturally interpreted as changes and corrections falling within the technological range of the present invention.

The present invention can be applied to a radio communication system, a radio communication apparatus employed in the system and a computer program implementing the functions of the apparatus. More particularly, the present invention can be applied to a radio communication system for making a PCA (Prioritized Channel Access) in a band reserved in advance, a radio communication apparatus employed in the system and a computer program implementing the functions of the apparatus.

What is claimed is:

1. A radio communication system comprising a plurality of radio communication apparatuses on a radio network connecting the radio communication apparatuses wherein, each of the radio communication apparatuses comprises:
   a buffer storing data to be transmitted on the radio network; and
   an access setting unit configured to:
      prescribe a super frame period within a predetermined time period;
      set a reserved period within the super frame for accessing the radio network, wherein the super frame includes a media access slot, reservation control information including a reservation type block, and a reason code type block, the reservation type block including a code identifying a type of reservation and the reason code including a code value used to adjust a reservation;
      set a network allocation vector to prevent one of the radio communication apparatuses to communicate on the radio network until communication between additional radio communication apparatuses terminates, wherein a first type of network allocation vector is set when a clear to send or request to send signal is detected, and a second type of network allocation vector is set based on the media access slot when a predetermined amount of data larger than a threshold amount is concentrated to a specific buffer of a respective radio communication apparatus;
      determine a priority status of the data stored in the buffer, the priority status being determined according to a measurement of the amount of data stored in a buffer for each respective radio communication apparatus; and
      select either a first reservation setting method not contending with reservation setting by another radio communication apparatus when the predetermined amount of data larger than the threshold amount is concentrated to the specific buffer, or a second reservation setting method possibly contending with reservation setting by another radio communication apparatus when data is not concentrated to a specific buffer of a respective radio communication apparatus.

2. The radio communication system according to claim 1 wherein, in order for first and second radio apparatuses to communicate using the first reservation setting method:
   the first radio communication apparatus transmits a beacon signal to the second radio communication apparatus to request a reservation;
   the second radio communication apparatus transmits a beacon signal to the first radio communication apparatus conveying information for adjusting the reservation; and
   the first and second radio communication apparatuses confirm the reservation based on the adjustment information.

3. The radio communication system according to claim 1 wherein, in order for first and second radio communication apparatuses to communicate using the second reservation setting method:
   the first radio communication apparatus receives a beacon signal from the second radio communication apparatus containing information on a reservation state of the second radio communication apparatus;
   after confirming a reservation, the first radio communication apparatus transmits a beacon signal to the second radio communication apparatus notifying the second radio communication apparatus that the reservation has been confirmed; and
   the second radio communication apparatus reserves a period for communicating on the radio network with the first radio communication apparatus based on reservation confirmation.

4. A radio communication apparatus for communicating with other radio communication apparatuses through a radio network, the radio communication apparatus comprising:
   a buffer storing data to be transmitted on the radio network;
   an access setting unit configured to:
      prescribe a super frame period within a predetermined time;
      reserve a period within the super frame for accessing the radio network, wherein the super frame includes a media access slot, reservation control information including a reservation type block, and a reason code type block, the reservation type block including a code identifying a type of reservation and the reason code including a code value used to adjust a reservation;
      set a network allocation vector to prevent the radio communication apparatuses to communicate on the radio network until communication between additional radio communication apparatuses terminates, wherein a first type of network allocation vector is set when a clear to send or request to send signal is detected, and a second type of network allocation vector is set based on the media access slot when a predetermined amount of data larger than a threshold amount is concentrated to a specific buffer of a respective radio communication apparatus;
   a beacon generation unit configured to generate a beacon signal for notifying another radio communication apparatus of information on a set reservation for accessing the radio network; and
      determine a priority status of the data stored in the buffer, the priority status being determined according to a measurement of the amount of data stored in a buffer of the radio communication apparatus; and
   a beacon-signal analysis unit configured to analyze a beacon signal received from another radio communication apparatus;
   wherein the access setting unit is further configured to select either a first reservation setting method not contending with reservation setting by another radio communication apparatus when the predetermined amount of data larger than the threshold amount is concentrated to the specific buffer, or a second reservation setting method possibly contending with reservation setting by another radio communication apparatus when data is not concentrated to a specific buffer of a respective radio communication apparatus.

5. The radio communication apparatus according to claim 4 wherein, when the access setting unit selects the first reservation setting method:
   the radio communication apparatus transmits a beacon signal requesting a reservation to communicate with one of the other radio communication apparatuses; and
   after a beacon signal is received from the other radio communication apparatus conveying information for adjusting the reservation, the reservation is confirmed based on the adjustment information.

6. The radio communication apparatus according to claim 4 wherein, if any one of the other radio communication apparatuses, which is to serve as a communication partner of the radio communication apparatus, has been identified, the first reservation setting method is selected.

7. The radio communication apparatus according to claim 4 wherein, when the access setting unit selects the second reservation setting method:
the radio communication apparatus receives a beacon signal from one of the other radio communication apparatuses to obtain information on a reservation state of the other radio communication apparatus; and
after confirming the reservation, the radio communication apparatus transmits a beacon signal to the other radio communication apparatus notifying the other radio communication apparatus that the reservation has been confirmed.

8. A communication method for a plurality of radio communication apparatuses on a radio network, the method comprising:
prescribing a super frame period within a predetermined time;
setting a reserved period within the super frame as a period for accessing the radio network, wherein the super frame includes a media access slot, reservation control information including a reservation type block and a reason code type block, the reservation type block including a code identifying a type of reservation and the reason code including a code value used to adjust a reservation;
setting a network allocation vector to prevent one of the radio communication apparatuses to communicate on the radio network until communication between additional radio communication apparatuses terminates, wherein a first type of network allocation vector is set when a clear to send or request to send signal is detected, and a second type of network allocation vector is set based on the media access slot when a predetermined amount of data larger than a threshold amount is concentrated to a specific buffer of a respective radio communication apparatus;
determining a priority status of the data stored in a buffer for transmission on the radio network, the priority status being determined according to a measurement of the amount of data stored in a buffer of the radio communication apparatus; and
selecting either a first reservation setting method not contending with reservation setting by another radio communication apparatus when the predetermined amount of data larger than the threshold amount is concentrated to the specific buffer, or a second reservation setting method possibly contending with reservation setting by another radio communication apparatus when data is not concentrated to a specific buffer of a respective radio communication apparatus.

* * * * *